United States Patent
Miyamoto et al.

[19]

[11] Patent Number: 6,132,315
[45] Date of Patent: Oct. 17, 2000

[54] GAME SYSTEM OPERABLE WITH BACKUP DATA ON DIFFERENT KINDS OF GAME MACHINES

[75] Inventors: Shigeru Miyamoto; Takao Shimizu; Satoshi Nishiumi; Kazuo Koshima, all of Kyoto, Japan

[73] Assignee: Nintendo Co., Ltd., Kyoto, Japan

[21] Appl. No.: 09/189,797

[22] Filed: Nov. 12, 1998

[30] Foreign Application Priority Data

Nov. 20, 1997 [JP] Japan .................................. 9-337654
Jul. 30, 1998 [JP] Japan .................................. 10-230176

[51] Int. Cl.[7] .................................................. A63F 13/00
[52] U.S. Cl. .............................................................. 463/43
[58] Field of Search .................................. 463/43, 39, 40, 463/41, 42, 44, 45, 1; 273/148 B

[56] References Cited

U.S. PATENT DOCUMENTS

| | | |
|---|---|---|
| 4,858,930 | 8/1989 | Sato . |
| 5,552,799 | 9/1996 | Hashiguchi . |
| 5,785,598 | 7/1998 | Hsu .............................. 463/44 |
| 5,828,862 | 11/1998 | Singkornat et al. ............ 463/44 |
| 5,850,230 | 12/1998 | San et al. ...................... 463/44 |
| 6,007,428 | 12/1999 | Nishiumi et al. .............. 463/43 |
| 6,022,274 | 2/2000 | Takeda et al. ................. 463/44 |

FOREIGN PATENT DOCUMENTS

| | | |
|---|---|---|
| 0 780 771 | 6/1957 | European Pat. Off. . |
| 0 431 723 | 6/1991 | European Pat. Off. . |

OTHER PUBLICATIONS

Simpson, A. "Mastering WordPerfect 6.1 for Windows Special Edition Second Edition," pp. 16–18, 647, and 1132–1133 (1995).

*Primary Examiner*—Jessica J. Harrison
*Assistant Examiner*—Sheila Clayton
*Attorney, Agent, or Firm*—Nixon & Vanderhye P.C.

[57] ABSTRACT

A game system utilizes a first game machine and a second game machine. The backup data obtained through playing a first game on the first game machine is memorized in a first game cartridge. The first game cartridge is attached to an extension adapter, and the extension adapter is in turn mounted on a controller for the second game machine. Accordingly, the backup data of the first game machine is taken into the second game machine. The second game machine is attached with a second game cartridge. The second machine executes a second game by processing the backup data according to a second game program set up in the second game cartridge.

56 Claims, 18 Drawing Sheets

GAME SYSTEM OPERABLE WITH BACKUP DATA ON DIFFERENT KINDS OF GAME MACHINES

BACKGROUND OF THE INVENTION

1. Field of the Invention

This invention relates to a game system which can use backup data on different kind game machines for playing games. More particularly, the invention relates to a game system which can utilize the backup data memorized in a certain-kind-game-machine memory medium, such as a game cartridge, on another different kind game machine superior in processability to the one kind game machine, thus realizing game play in association with between different kind game machines in an inter-linking fashion.

2. Description of the Prior Art

Conventionally, there has been an prior art as known in Japanese Patent Laying-open No. H7-92943 (U.S. Pat. No. 5,552,799) wherein game play is possible on a video game machine with using a program memorized on a game cartridge for a portable game machine. However, this prior art is not adapted to play an inter-linking game on the video game machine by the utilization of the backup data memorized on a portable-machine game cartridge.

Also the conventional game software for portable or video game machines, even if serially arranged in respect of genru or game idea, are produced independently of between the video game machines different in processability one another. There has been no game software available that takes interchangeability into account or games are played in an associated fashion on different kind game machines.

There has been no interchangeability in the conventional game software between different processabilities of portable or video game machines. It is impossible to use such data (so-called backup data) that varies due to game progression and gained through playing on one game machine, in game play on another game machine different in processability from the one game machine. Due to this, there are difficulties in making efficient use of such game-progression-related data as gained through spending significant time, e.g., the data of captured characters or character capability values in a game to capture appearing characters; and the data of cleared stages, player object capability values and experience values in a game to clear stages by increasing the player character (or player object) experience value while battling with appearing enemies as in a role-playing game. That is, where the video game machines for playing a game with game software are different from one another, even if the software is applicable for a higher-grade machine that is the same in method and rule of game play, it is impossible to perform game play on another higher-grade game machine with using game-progression-related data, such as on experience value, that have acquired through playing with the game software on one game machine. Thus associated games on between different kind game machines have not been realized.

The players are probably not expecting perfect interchangeability between the higher and lower processability game machines. However, they may have a desire to effectively utilize game-progression-related backup data (e.g., captured character kinds and capability values, experience value data, gained items or life, etc.) having acquired through playing with lower-grade-machine game software, or to play an associated game on between different game machines.

Also, the transfer of game software data to a different game machine requires especial connection hardware. However, no connection hardware is available which is appropriate or easy to use or handle.

In the meanwhile, where an interchangeability is given to between game-soft memory mediums of different game machines, there would be change of backup data after playing, on a higher-grade game machine, with utilizing the backup data memorized on a memory medium of a cartridge type or game-machine-integrated type. This changed backup data has to be update-written into the memory medium. In such a case, when a plurality of players are playing simultaneously on a higher-grade game machine, there may occur difference in status between the memory medium from which the backup data has been read at game start and the memory medium to be written by updated backup data upon ending the game. If a memory medium of one player be written over by another player's backup data, he would lose his own backup data that has been acquired and raised characters through devotion of his energy. Such a situation would throw the player into a strong disappointment or displeasure, and hence should be prevented.

SUMMARY OF THE INVENTION

Therefore it is a primary object of the present invention to provide a novel game system.

It is another object of the present invention to provide a game system which is capable of utilizing data, that has been obtained through playing game software for one game machine and varies due to game progression, to play a game according to associated or inter-linked game software for another game machine.

It is still another object of the present invention to provide a game system which is capable of utilizing data, that has been obtained through playing game software for one game machine and varies due to game progression, to enjoy a more sophisticated or associated game.

It is a further object of the present invention to provide a game system which is capable of writing own backup data into a memory medium without erroneously writing over by other player's backup data even where a plurality of players play on a same higher-grade game machine by providing player-by-player identification data in memory mediums memorizing game software.

A game system playable utilizing backup data for different kind game machines according to the present invention, is adapted to use the backup data, obtained through playing a game on a first game machine including a first processing means, for game play on a second game machine different from the first game machine but including a second processing means.

Specifically, the game system, comprises: a first backup data memory means for memorizing backup data obtained by processing a first game program memorized in a first game program memory means by a first processing means included in a first game machine; a second game machine having a second processing means; an access means for causing the second processing means to access to the first backup data memory means; a second backup data memory means provided in association with the second game machine and temporarily memorizing the backup data read out of the first backup data memory means by the second processing means; and a second game program memory means provided in association with the second game machine and memorizing second game program to be processed by the second processing means, wherein the second processing means effects a game associated with the backup data by executing the second game program memorized in the second game program memory means while utilizing the backup data memorized in the second backup data memory means.

According to the present invention, a novel game system is provided that can utilize the data (so-called backup data), that has been obtained through playing certain machine game software and varies due to game progression, in playing a game according to associated game software for another game machine.

With the game system of the invention, it is possible to enjoy a second game by taking over the backup data, such as experience values, lives and gained characters, obtained through playing a first game according to past-released game software for different kind game machine. Due to this, time saving is available to obtain desired backup data as compared with the play with second-game software from its beginning.

Where an earlier-released first game machine is lower in processability than a later-released second game machine, it is possible to play a game with functions higher than those of the first-machine game software according to second-machine game software associated with a first-machine game content.

The access means includes a connection means for electrically connecting the second processing means to the first backup data memory means.

This electrically connecting means includes a game machine connection means for connecting the first game machine to the second processing means where the first backup data memory means is incorporated in the first game machine. The game machine connection means, specifically, includes a connector means for connecting between a first interface provided in the first game machine and connected to the first processing means and a second interface provided in the second game machine and connected to the second processing means.

The electrically connecting means includes a memory medium connection means for connecting the first external memory medium to the second processing means when the first backup data memory means includes a first external memory medium that is attachable to and detachable from the first game machine. Specifically, where there is a controller associated with the second game machine and connected to the second processing means, the memory medium connection means includes an adapter means for connecting the external memory medium to the controller. The adapter means includes a first connector provided on the controller and a second connector connected to the first connect.

The first game program memory means and the first backup data memory means may be formed at different areas in the first memory means or on one memory medium.

The second game program memory means and the second backup data memory means may be formed at different areas in the second memory means or on one memory medium.

In a preferred embodiment, further comprised are a first identification information holding means for holding first identification information (game name, version data) in association with the first backup data memory means and a use determining means for determining based on the first identification information on whether the backup data of the first backup data memory means is usable or not. In this case, an inapplicable notifying means notifies an inapplicability when not-usable is determined by the use determining means.

In one aspect of the present invention, the game system further comprise a write means for writing the backup data read out by a second processing means into the second backup data memory means. Where the second backup data memory means includes a plurality of memory areas, the game system further comprises a specifying means for specifying the first backup data memory means, wherein the write means writes the backup data into one of the memory areas corresponding to the first backup data memory means specified by the specifying means. Where the access means includes a plurality of access channels through which the plurality of first backup data memory means are enabled to access by the second processing means, the specifying means specifies an access channel through which the second processing means has accessed to the first backup data memory means thereby specifying the first backup data memory means.

In an important phase of the present invention, the game system further comprises an update means for updating the backup data memorized in the first backup data memory means depending upon change caused as a result of executing the second game program by the second processing means. The updated backup data is once written in the second backup data memory means. Where the second backup data memory means includes plurality of memory areas, the update means writes the backup data into one of the plurality of memory areas corresponding to a first backup data memory means specified by a specifying means for specifying the first backup data memory means.

Also, the game system comprises a second identification information holding means for holding second identification information in association with the first backup data memory means, an identification information read means for reading out the second identification information from the second identification information holding means, and a temporary memory means for temporarily memorizing the second identification information, wherein an update determining means determines on whether the backup data in the first backup data memory means may be updated or not, depending upon the second identification information memorized in the temporary memory means.

The update determining means, specifically, includes a read means for reading out the second identification information associated with the first backup data memory means to which the second processing means is accessing, and a second identification information determining means for determining on whether the second identification information memorized in the temporary memorizing means and the second identification information read out by the read means are in a predetermined relationship or not.

In this aspect, when a plurality of players plays games simultaneously using their own first-machine backup data on the second game machine and thereafter write varied backup data into their own ones of the first backup data memory means, it is possible to prevent against writing with another player's backup data by mistake.

Incidentally, the second game program may be a game program associated with the first game program, and the second game program may include a conversion program for rendering the first game program in a form processable by the second processing means. Where the conversion program includes an acceleration program according to which the second processing means can execute the first game program at a speed higher than a speed of execution of the first game program by the first processing means, it is possible to play a game with the first game program on the second game machine at a speed higher than that of play with the first game program on the first game machine.

The first and second game programs may be arbitrary kinds of game programs. In one embodiment, the first game program includes a game program to capture a character appearing in a game, a captured character code to specify a captured character when a player captured the character appearing in the game, a write program to memorize capability data representative of capability of the character into the first backup data memory means, and the second game program includes a battle process program to effect a game process by using the captured character code and the capability data for each captured character to cause battling with a character captured by another player.

In another embodiment, the first game program includes a program for displaying a two-dimension character as an image for the game, a game program for capturing a character appearing in the game, and write program for specifying a captured character code to specify a captured character when the program captured a character appearing in game into the first backup data memory means, and the second game program including a program for displaying each character with polygons in a three-dimension image corresponding to a character code, displaying the captured character in the three-dimension image based on the captured character code.

The above described objects and other objects, features, aspects and advantages of the present invention will become more apparent from the following detailed description of the present invention when taken in conjunction with the accompanying drawings.

DETAILED DESCRIPTION OF THE PREFERRED EMBODIMENTS

The "game system playable by utilizing backup data on different type game machines" (hereinafter referred to as as "game system") embodied in the present invention includes a first-machine that is a portable game machine or an LCD-type portable game machine, and a second-machine of a video game machine. Using the backup data obtained through playing according to a first-machine game software on the first-machine, the game is played on the second-machine while processing a second-machine game program associated with (or inter-linked to) the first-machine game software. That is, the second-machine game program is executed in association with the first-machine game.

Here, the backup data may take various data forms in respect of genru or kind of game software. For example, where the software is concerned with a game to capture animals, imaginary pets, or fictional animals (monsters), or to raise captured animals, or to make the animals captured by one and his friend to battle with, the backup data may be constituted by the data of captured-character to specify characters thus captured, the data representing capabilities of the captured characters or the data of tricks applicable to the battle. Where the software is of a role playing game, the backup data may include the data concerning the kind and number of acquired items, the kind of black arts applicable, experience values, life values, etc. Further, where the game software is a baseball game as one example of sport games, the backup data may include, in a past team play, a batting average, the number of home runs, the number of stolen bases, an error rate, an earned run average, and the number of strikeouts of each player, or his butting power, running power, ball speed, etc. matched to a training condition.

In this manner, the backup data varies depending on a kind of game. Now explanations will be made on a game to capture a fictional animal or the like, train (raise) the captured fictional animal or make it battle.

Figure 1:
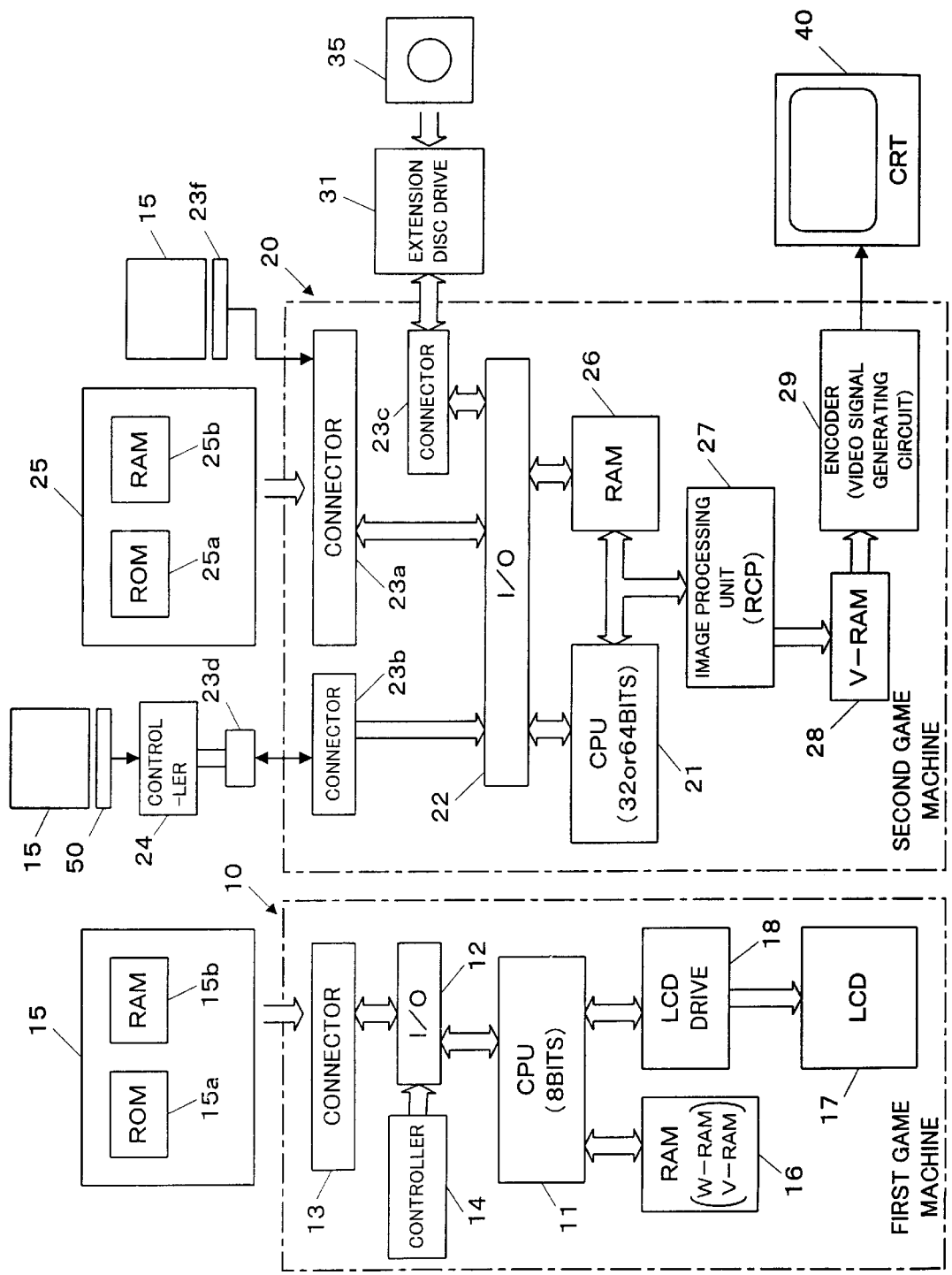
FIG. 1 is a principle block diagram of a game system according to one embodiment of the present invention.

FIG. 1 is a principle block diagram of a game system according to one embodiment of the present invention. In FIG. 1, the game system of the invention includes a first-machine 10 having a game cartridge 15 memorizing backup data at its backup data storing memory (temporary storing memory: e.g., RAM). This backup data can be utilized to play a game using a second-machine game program memorized in a game cartridge 25 or a disc memory medium 35. That is, a game related to the first-machine game software or a game operable in association with the first-machine 10 can be played using the backup data.

Here, the first-machine 10 is for example a portable game machine or an LCD-type game machine (e.g., the product "Game Boy" marketed by the present applicant; registered trademark). The second-machine 20 is for example a recently-developed game machine (e.g., the product "Nintendo 64" marketed by the present applicant) utilizing an advanced technology, such as 32 or 64 bits, higher in processability (for example in CPU bit number, CPU program processability per unit time or image representability) as compared with that of the first-machine 10. Note that the first-machine 10 may employ, for example, an 8- or 16-bit video game machine if it is lower in processability than the second-machine 20. Also, the second-machine 20, if possessing a processability of 16 or 32 bits, may be equivalent in processability to the first-machine 10. This would be effective for such a case that the first-machine 10 is of a portable type and the second-machine 20 is stationary type connectable to a home-use TV set. However, the invention is of course not limited in respect of technical idea to the above-stated cases.

Now explanations will be made in detail on the first-machine 10 constituting a basis for the game system of the invention and the memory cartridge (external memory medium) 15 usable as one example of a memory medium therefor. In the below explanation an LCD-type portable game machine is used as an example of the first-machine 10. The first-machine 10 includes, for example, an 8-bit CPU (first processing means) 11. The CPU 11 is connected with an input/output interface (hereinafter referred to as "I/O") 12. To the I/O 12 are connected a connector 13 as well as a controller 14 for instructing the movement or motion of a game character. A memory cartridge 15, stated later, is disconnectably connected to the connector 13. Further, the CPU 11 is connected with a RAM 11, including a working RAM, a display RAM and the like, and an LCD drive circuit 18 for driving a liquid crystal display (LCD) 17.

Figure 3:
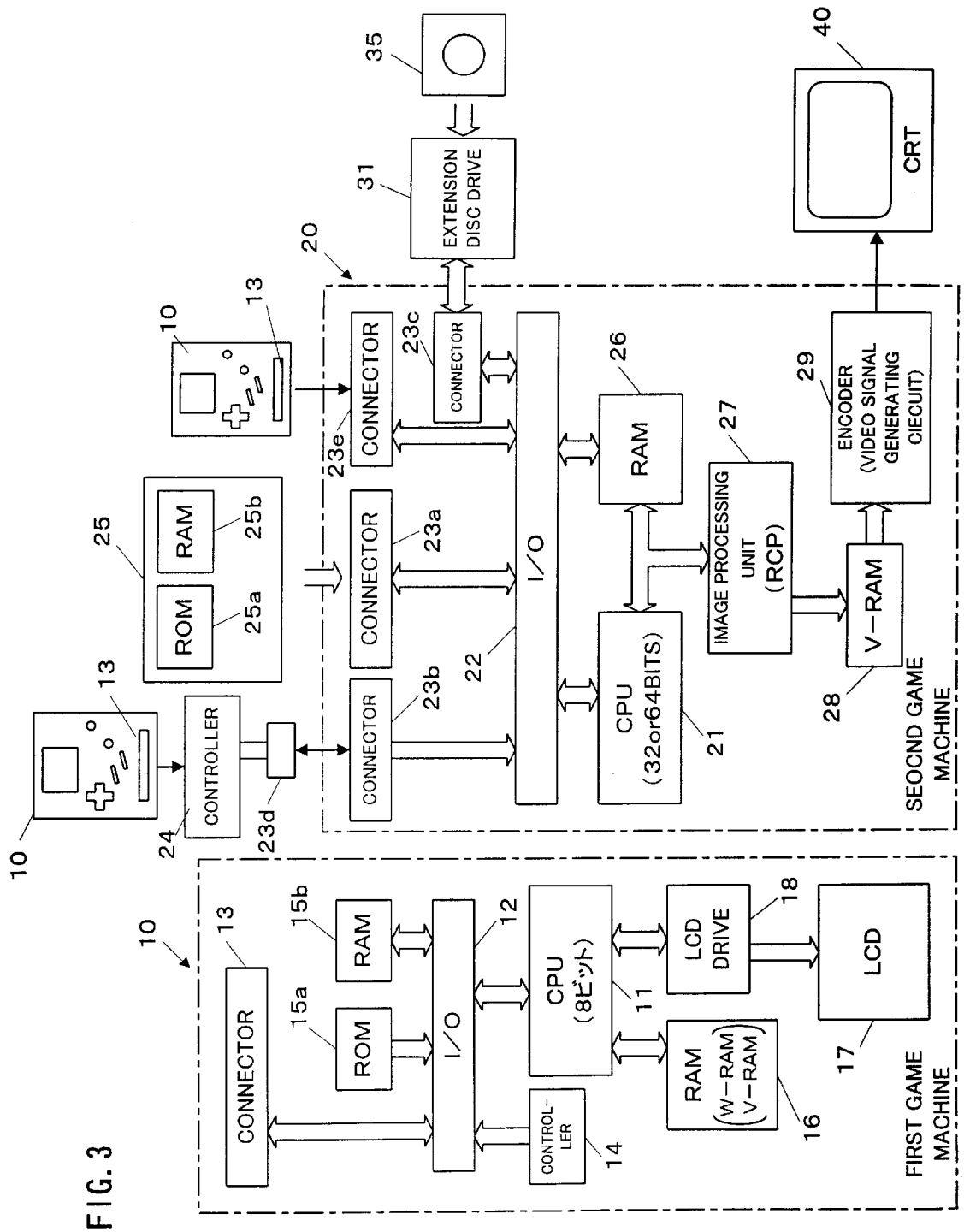
FIG. 3 is a principle block diagram of a game system according to another embodiment of the present invention.

Note that the first-machine 10 is not limited to such a structure that is detachably attached with a memory cartridge 15 but may be a structure incorporating therein a ROM 15a and RAM 15b and a housing is integrally provided with a connector to transfer the backup data memorized on the RAM 15b directly or indirectly through a cord, etc., as shown in FIG. 3.

In place of the ROM 15a, a RAM having a large capacity (S-RAM), whose data is prevented by a battery from being disappeared, may be provided. One part of the S-RAM is used as a program area corresponding to the ROM 15a and the remaining area is used as a backup data (temporarily memorizing) area corresponding to the RAM 15b. In such a case, the first-machine game program is previously memorized on the program area. The program area is installed with a program to prohibit backup data from being written thereon. Further, in place of using the cartridge 15 (external memory medium) including the ROM 15a and RAM 15b, a high-capacity RAM (can be used with the built-in RAM 16) may be provided within the first-machine 10 so that the RAM is used both as program and backup data areas wherein the program area is updated and written by the data of a desired program.

The memory cartridge 15 incorporates, by mounting on a substrate, a non-volatile memory (e.g., ROM, EP-ROM, one-time ROM; hereinafter referred to as "ROM") 15a for memorizing a first-machine game program, and a writable readable memory (e.g., RAM, EP-ROM; hereinafter referred to as "RAM") 15b as one example of a backup data memory means (or temporary memorizing means) for memorizing backup data occurring and developing in the course of game progression.

Figure 2:
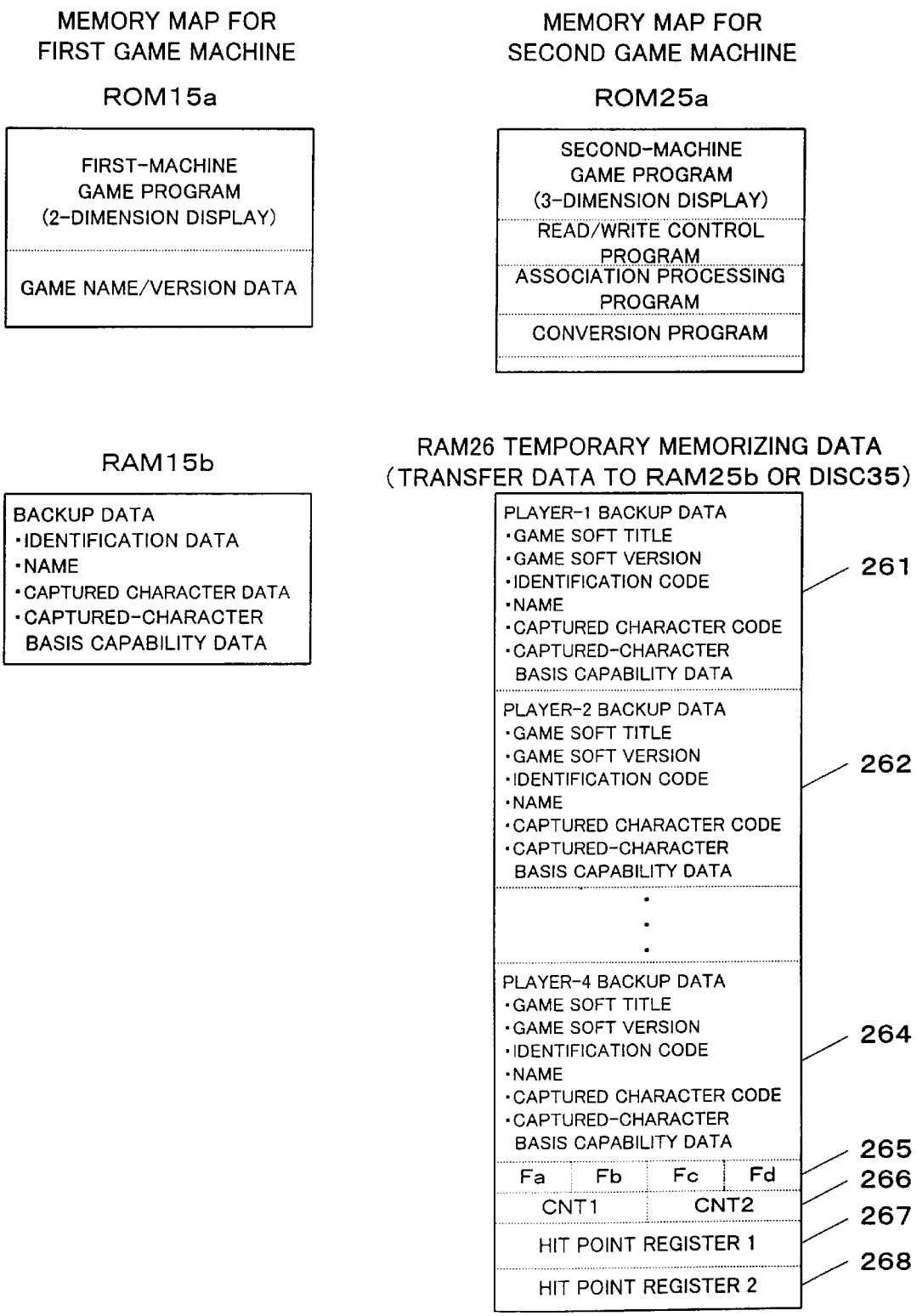
FIG. 2 is an illustrative view of a memory map of memories used in first and second game machines in the FIG. 2 principle block diagram.

The ROM 15a is previously memorized, as shown in a memory map at upper left in FIG. 2, with a first-machine game program (e.g., the data of characters appearing the game, program data for controlling the characters in display, backup data write program, etc.), as well as game title data (the game title and the versions if one game title includes versions). The RAM 15b includes a memory area for memorizing, on a cartridge-by-cartridge basis, a discrimination code, player (or trainer) names, data of gained characters, gained-character capability data, etc. The substrate has a plurality of terminals formed at one side, for electrical connection to the connector 13.

Note that the identification code refers to an arbitrary code a user has inputted by operating the controller 14 in order to discriminate an owner of the cartridge 15 or a serial No. of the first-machine 10. For example, the ROM 15a may be structured by a one-time ROM fixedly written with a serial No. of the cartridge 15 thereon.

Now explanations will be made in detail on the second-machine 20 to which the invention is applied and the memory cartridge (hereinafter referred to as "cartridge") 25 used as one example of an external memory medium therefor. The second-machine 20 includes, for example, a 64-bit CPU (second processing means) 21. The CPU 21 is connected with an input/output interface (hereinafter referred to as "I/O") 22. To the I/O 22 are connected a connector 23a for connection with a second-machine memory cartridge 25, a connector 23b for connection with a controller 24, and a connector 23c if required. The connector 23b is connected with a controller 24 through a connector 23d. Note that, where the second-machine 20 is usable for a game in which a plurality of players participate at a same time, a plurality of sets of connectors 23b, controllers 24 and connectors 23d are provided.

The connector 23a is disconnectably connected with the cartridge 25. Further, the CPU 21 is connected with a RAM 26 employed as a working RAM and an image processing unit (RCP) 27.

The RAM 26 includes, as shown at lower right in FIG. 2, memory areas 261–264 respectively utilized for a plurality of players, and further including a flag area 265, a counter area 266, and register areas 267, 268. The memory areas 261–264 are written, at areas corresponding to the controller, by backup data (cartridge 15 identification code, name, data of gained characters, data of capability for each gained character, etc.) and game-software title and version data which have been stored in the RAM 15b of the cartridge 15 connected to the controller 24A–24D through an extension adapter 50. The flag area 265 includes flags Fa–Fd corresponding respectively to the controllers 24A–24D, which can be written by a logic "1" to discriminate any of the controllers 24A–24D connected with a cartridge 15. The counter area 266 is utilized for counters (CNT1, CNT2) that are used to detect a controller 24A–24D in connection with the cartridge 15, and a player-by-player memory area in the RAM 26. The register areas 267, 268 are used to memorize power of two player's monsters battling in a battle mode.

The RCP 27 is connected with a video RAM 28. The video RAM 28 has a memory area for memorizing red (R), green (G) and blue (B) of color data corresponding to each dot of one CRT screen such as of a raster scan display, so that color data is written in and/or read from the memory area for color display under control of the RCP 27. The color data read from the video RAM 28 is converted by an encoder and/or composite image signal generating circuit 29 into analog R, G, B signals and/or a composite image signal for being supplied to the CRT.

The memory cartridge 25 is structured similarly to the memory cartridge 15, and incorporates, by mounting on a substrate, a non-volatile memory (e.g., ROM, EP-ROM; hereinafter referred to as "ROM") 25a for memorizing a second-machine game program, and a writable readable memory (e.g., RAM, EP-ROM; hereinafter referred to as "RAM") 25b as one example of a temporary memorizing means for memorizing backup data occurring and varying due to game progression.

The ROM 25a uses a ROM that is greater in capacity than the ROM 15a, and is previously memorized, as shown in a memory map at upper right in FIG. 2, with a second-machine game program (e.g., data of characters appearing in the game, program data for display-controlling each character, program for writing backup data, etc.). Although the game program memorized by the ROM 25a is partly common in scenario or playing way to the first-machine program, the ROM 25a includes a program particularly to realize image representation and complicated scenario that are reflectable by the processability of the second-machine 20. For example, if the first-machine game program is to display second-dimension images, the second-machine program may be to represent three-dimension images or to represent three-dimension images in addition to the second-dimension game images as the scene may be. Besides, the second-machine program may include an increased number of modes of training, raising, etc. or an increased kinds of combat ways or rules, or other variations, as compared with those of the first-machine program.

The RAM 25b has a memory capacity of several times greater than that of the RAM 15b in order to memorize the backup data of a plurality of players. Otherwise, the memory capacity of the RAM 25b may be the same as that of the RAM 15b if an extension disc drive 31 is employed. The RAM 25b has a circuit board having a plurality of terminals formed on one side so that it is electrically connectable with the connector 23a.

Incidentally, a writable/readable magnetic disc drive 31 may be used, if extensionality is required for the player to temporarily memorize game-related backup data or modify the game program in order to enjoy his own game program. In such a case, the extension disc drive 31 is connected to the connector 23c. On the extension disc drive 31 is mounted a writable and readable disc (e.g., magnetic disc) 35, such as a magnetic disc or magneto-optical disc. This disc 35 is used in place of or in combination with the memory cartridge 25. It is also possible to use, in place of the magnetic disc 35, an extension memory medium, such as a CD-ROM, hard-disc, and magneto-optical disc.

Now explanations will be made on the operation to enjoy a game using the present game system. When a first-machine 10 is used to enjoy a game, the player may attach a memory cartridge containing desired game software onto the machine so that he manipulates the controller 14 to play a first-machine game. At this time, the CPU 11 generates display data for a player character (character making motions in response to player's operation), according to a program of the ROM 15a and an operating status of the controller 14. The CPU 11 also generates display data for a background, enemy character, etc. according to programs, irrespectively of the player's operation. The display data is combined and then supplied to the LCD drive circuit 18, for being displayed on the LCD 17. During game operation, the CPU 11 makes update of the backup data by temporarily memorizing it into the RAM 16 each time a condition to generate or update backup data is fulfilled in the progress of a game, and transfer the backup data therefrom to the RAM 15b at appropriate timing. In the case of a game to capture a fictional animal, the backup data to be memorized in the RAM 15b includes, for example, player-designated name data, owner-specifying identification data created by random number data, captured-animal name data or character codes, captured-animal capability data, and growth data by raising, as shown in a memory map at lower left in FIG. 2. Note that the backup data differs depending on a game kind or genru, as stated before.

To enjoy an associated (or inter-linking) game on the second machine 20 utilizing the backup data gained through playing the game on the first machine 10, the second machine 20 is attached, at its connector 23a, with a memory cartridge 25 memorizing a game program (for a series game wherein higher exchangeability is secured at least in one part function) having a relation to a game content in the memory cartridge 15. Or otherwise, a disc 35 similarly memorizing a program having a relation thereto is attached to the extension disc drive 31. In addition, the memory cartridge 15 containing desired backup data is attached to the extension adapter 50 (FIG. 5, FIG. 6) as one example of a connecting means, so that this extension adapter 50 is attached to the connector 24a (FIG. 7, FIG. 8) of the controller 24. Due to this, the second-machine 20 is placed into an indirect connection with the cartridge 15 for the first-machine 10 through the extension adapter 50 and the connecting means such as an appropriate connector.

Thereafter the controller 24 is operated in order to start the second-machine game. Although the CPU 21 at this time begins to operate based on programs stored on the ROM 25a, it first reads out game title and version data memorized on the ROM 15a and writes the data onto a first-player area 261 in the RAM 26, and reads out the backup data (e.g., cartridge identification code, name, one or a plurality character codes, capability data by captured character, etc.) memorized on the RAM 15b and write the data into the area 261. When there are a plurality of players, another player connects one's own cartridge 15 to his controller 24 through an extension adapter 50 (FIG. 5, FIG. 6) so that the backup data is written to a second- (to -fourth) player area of the RAM 26. In this manner, the backup data is written on a player-by-player basis in the RAM 26 in a manner discriminating one's data from others'. The CPU 21 executes a game process based on the program stored in the ROM 25a, and makes game processing in association with the first-player's backup data memorized in the area 261 of the RAM 26. It can be considered that this associated process includes displaying a backup-data library, e.g., displaying character names based on the codes of captured characters, and displaying character-basis capability data together with the captured character names. The associated process, as other examples, may include various processes, such as displaying with capability classification to facilitate opting a character in a combat mode, displaying a list of same-kind characters with their numbers for reference to exchange characters with a friend, displaying with comparison of capability data of both-side characters when competing with a friend, processing a competition according to another rule, etc.

Utilizing the backup data on the memory cartridge 15, backup data occurs through playing according to the game program for the second-machine 20. That is, the newest backup data, obtained by updating the backup data upon being read from the RAM 15b, is memorized in the RAM 26 when the play on the second-machine 20 is ended. At this time, if the player opts an update mode by icon manipulation, the CPU 21 effects an updating process according to a read/write program. Specifically, the CPU 21 reads out the cartridge identification data, such as identification codes, names, etc., memorized in the RAM 15b of the memory cartridge 15 connected, in association, to the controller 24, and compares these read-out data with the cartridge identification data, such as relevant-player identification code, names, etc., memorized in the RAM 26. When the both identification data are coincident with (or in a predetermined relationship), the relevant-player's backup data memorized in the RAM 26 is read out and then written, for update, onto the RAM 15b. This prevents other player's backup data from being erroneously written over the RAM 15b of the memory cartridge 15.

The methods to connect the RAM 15b, with association, to the second-machine 20 includes a variety of modified embodiments. For example, the connector 24a (FIG. 7, FIG. 8) of the controller 24 and/or the connector 23e of the second-machine 20 may be formed adapted to the end-face shape and contact structure of the memory cartridge 15 incorporating the ROM 15a and RAM 15b so that the memory cartridge 15 can be connected directly or indirectly through cords or connectors to the controller 24 or the second-machine 20.

In place of the system structure shown in FIG. 1, another example of a game system as shown in FIG. 3 may be employed. That is, the embodiment of FIG. 3 incorporates the ROM 15a and RAM 15b in the first-machine 10 thus forming an integrated type, wherein the ROM 15a and RAM 15b are connected to the CPU 11 through the I/O 12, instead of forming the ROM 15a and RAM 15b of the memory cartridge 15 in a cartridge type. This connector 13 is determined in such a form and contact structure that is connectable to the connector of the controller 24 and/or the connector 23e of the second-machine 20. Thus, the connection of the connector 13 of the first-machine 10 to the connector (not shown) of the controller or to the connector 23e within the second-machine 20 allows the backup data memorized on the RAM 15b to be transferred through the I/O 12, connector 13, controller 24, connector 23d, connector 23b and I/O 22 or through the I/O 12, connector 23e and I/O 22 to the CPU 21 by which the data is written into the RAM 26. In this case, the program-memorizing ROM 15a and the backup-data-memorizing RAM 15b may be structured by a large capacity RAM having such a data capacity as adding together their capacities as was explained in the FIG. 1 embodiment, so that the large capacity RAM can be backed up by a battery to write the first-machine program into the program area prior to starting a game on the first-machine 10.

Further, the cord at its respective ends may be connected with connectors (not shown) fitable for the connectors 13, 23 so that the first-machine 10 (or RAM 15b) and the second-machine 20 are connected, in an indirect fashion, through the cord and the connectors. In such a case, the game play operation on the second-machine 20 may be implemented by using the first-machine controller 14 in place of the controller 24.

Incidentally, where using a disc 35 and disc drive 31, the extension adapter 50 or memory cartridge 15 may be connected to the attachment connector 23e (or disc drive exclusive connector). Also, if the second-machine 20 is provided with a connector for external memory (RAM) connection, then the extension adapter may be structured for connection to that connector.

Incidentally, the ROM 25a may have a conversion program (emulator program) memorized therein in order to convert the first-machine game program into a second-machine game program without providing the ROM 25a with a common program to that memorized in the ROM 15a. The program memorized in the ROM 15a is also written into the RAM 26 by means of a read/write control program thereby using the first-machine program as a program for the second-machine. By doing so, it is possible to eliminate duplication or inefficiency of programs.

Preferably, because the CPU 21 of the second-machine 20 is by far higher in processability than the CPU 11 of the first-machine 10, a conversion program with a high speed, such as 2-times, 4-times, or 8-times speed, may be memorized in addition to or in place of the program of same processing speed as that of the first-machine 10. This serves to increase the player object moving speed or other game progression speeds (the speed of raising or training captured animals, etc.), thus speeding up the game progression.

Now explanations will be made on further detailed embodiments.

Figure 4:
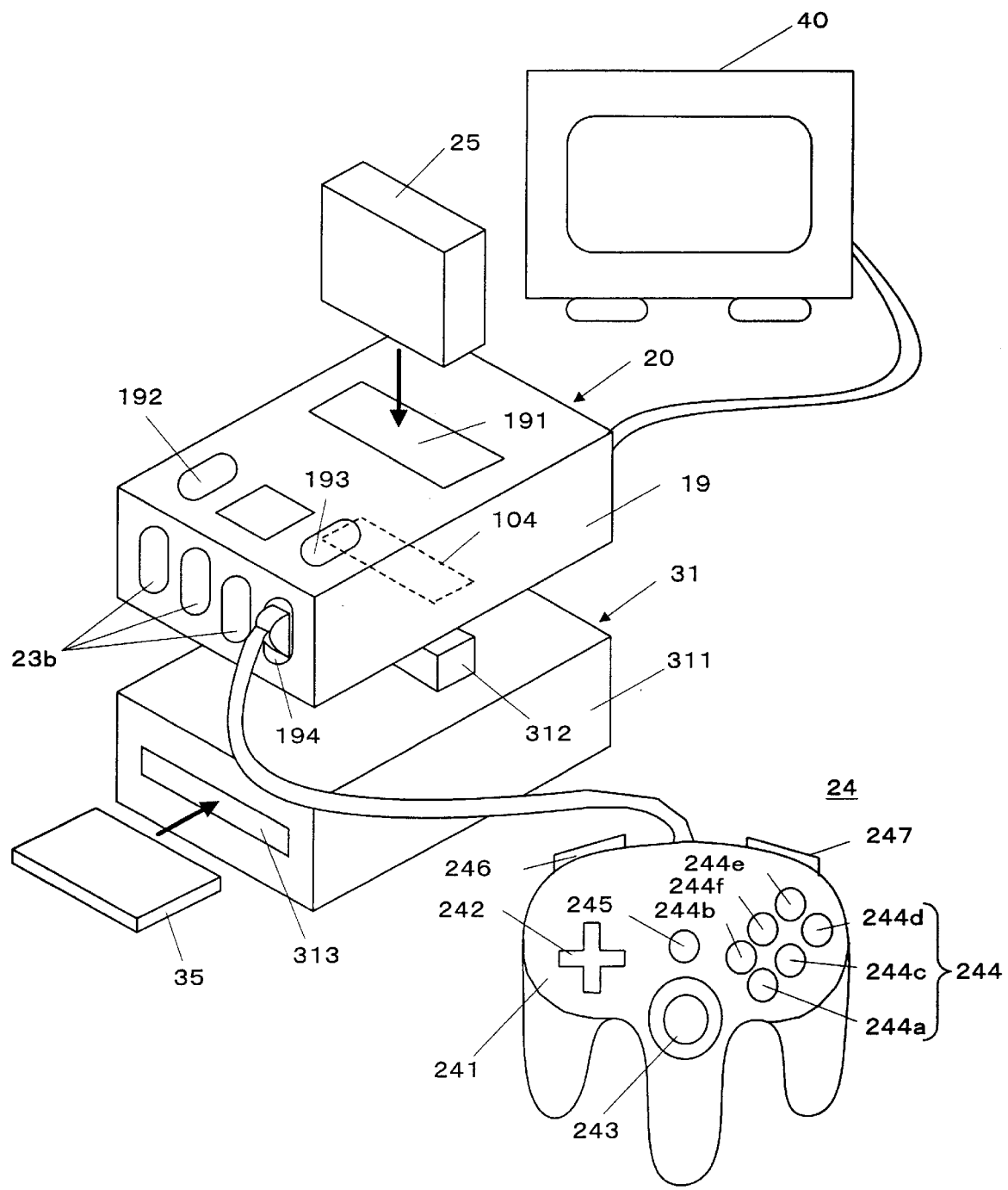
FIG. 4 is an external view of one example of a second game machine to which the present invention is applied.

Referring to FIG. 4, there is depicted an external view as one example of the second-machine 20 used in the game system of the invention. In FIG. 4, the second-machine 20 includes a housing 19, in addition to the circuit configuration shown in FIG. 1. The housing 19 has atop an insertion aperture 191 formed for receiving therethrough a cartridge 20 for the second-machine 20, and a power switch 192 and a reset switch 193 provided at a front thereof. The cartridge insertion aperture 191 is provided therein with a cartridge connector 23a (see FIG. 1). The game machine 20 has a front panel on which a plurality of controller connectors 23b are provided to connect with controllers 24. The game machine 20 has at a backside a connector for extension which is to be connected with a disc drive unit 31.

The controller 24 includes a housing 241 formed with handles (three in the illustration). The housing 241 has a top surface on which arranged are a direction instruct switch 242 for a player to operate instructing directions of character or object movement, an analog switch (referred to as also as a 3-D stick or joystick) 243 for analogically instructing directions of movement, and a plurality of motion switches 244 and reset/start buttons 245. The motion switches 244 includes switches 244a–244f, which are for instructing motions of a player character or player object in a game mode and selecting various kinds of commands in an image creation input mode. The housing also has, at upper side surface, side switches 246, 247 for instructing other motions. The controller 24 has an insertion hole 245 having therein a connector (not shown) which is used to connect with an extension RAM (not shown) in the case the RAM 15b is insufficient in memory capacity. The connector of the controller 24 is used to connect with an extension adapter 50. Note that in the explanations given hereinbelow it is assumed that up to four players can play at a same time on the second-machine 20. Where the controller requires to be distinguished with which the player is using, the controller for a first player will be referred to as 20A and second, third and fourth players respectively as 20B, 20C and 20D.

The disc drive 31 has a housing 311 having at a top a connector 312 for connection with an extension connector (FIG. 1 or FIG. 3). The housing 311 has a disc insertion aperture 313 formed at a front face thereof. Into the disc aperture 313 is inserted a disc-formed record (or memory) medium (hereinafter referred to as "disc") 35, such as a magnetic or magneto-optical disc, that is formed readable and writable.

The second-machine 20 is connected with a display unit (CRT) 40, such as a home-use TV set.

Incidentally, the connector 23b shown in FIG. 4 may be connected with a communication cable so that the first-machine 10 is directly connected with the second-machine 20 through the communication cable. In such a case, a cartridge other than the game cartridge 15 (FIG. 1) is attached to the first-machine 10 and this other cartridge is connected to the second-machine 10 through the communication cable and the connector 23b.

Figure 5:
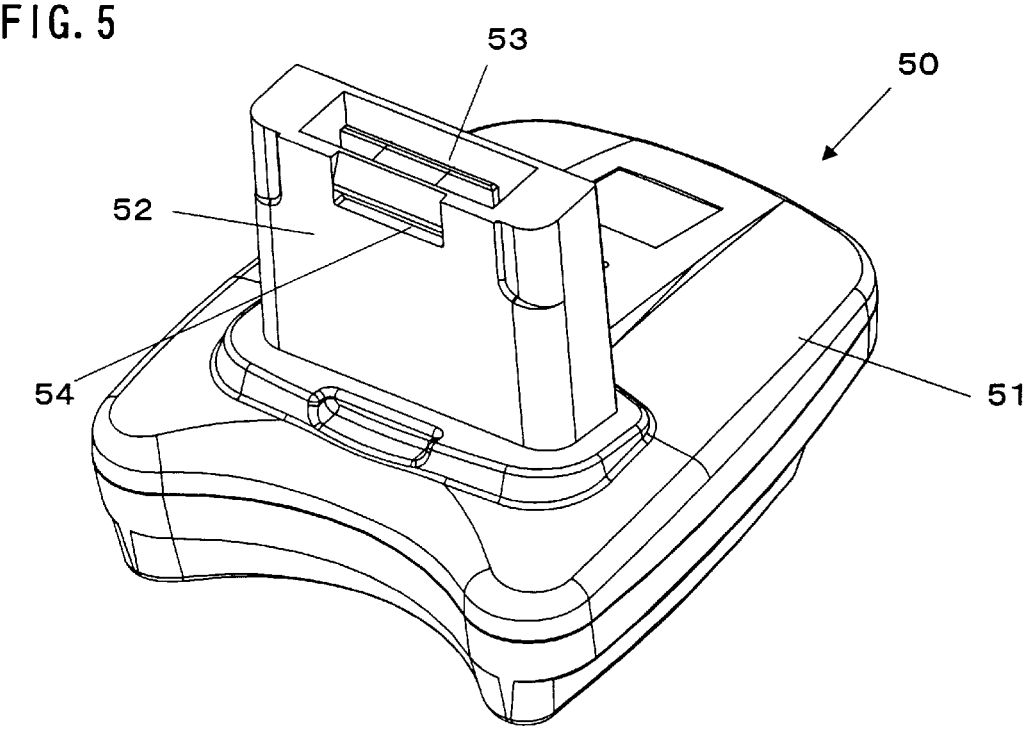
FIG. 5 is a perspective view of an extension adapter as viewed from above.
Figure 6:
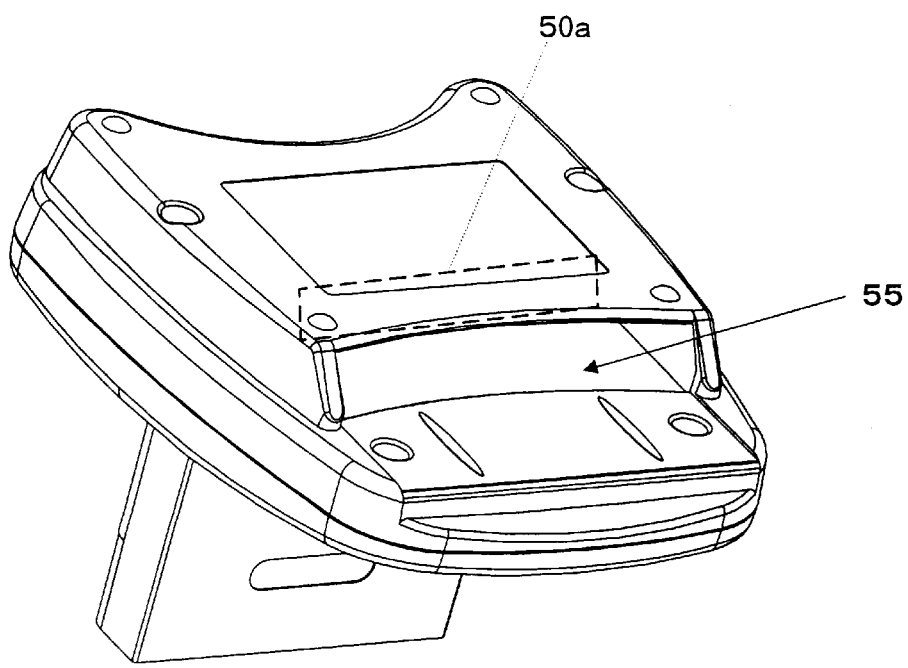
FIG. 6 is a perspective view of the extension adapter as viewed from backside.

Referring to FIG. 5 and FIG. 6, there are illustrated perspective views of an extension adapter 50, wherein FIG. 5 is a perspective view as viewed from the front while FIG. 6 a perspective view as viewed from the backside. The extension adapter 50 has an insertion projection 52 formed in a T-form on an upper surface of a housing 51. This insertion projection 52 is determined in such a form that can be inserted into an extension-RAM (not shown) insertion hole 248 (FIG. 7) formed on the backside of the controller 24. The insertion projection 52 has a connection circuit board 53 built therein. The connection circuit board 53 is connected in a T-form to a circuit board incorporated within the housing 51. The connection circuit board 53 is connectable to the connector 24a (FIG. 7, FIG. 8) provided deep within the insertion hole 248 of the controller 24. The insertion projection 52 is formed, in one side surface, with a lock recess 54 with which engageable for locking is a lock claw (not shown) formed within the insertion hole 248 of the controller 24. At the backside of the extension adapter 50, an insertion aperture 55 is formed in order to receive a first-machine cartridge 15. Within the insertion aperture 55, a connector 50a is arranged to connect with the cartridge 15. This connector 50a is connected to the circuit board. The circuit board is mounted with a detection circuit and a data transfer control circuit (both not shown). The detection circuit serves to detect that the cartridge 15 is attached to, while the data transfer control circuit transfers the data in the RAM 15b and/or ROM 15a of the cartridge 15 to the second-machine 20 via an internal circuit of the controller 24.

Figure 7:
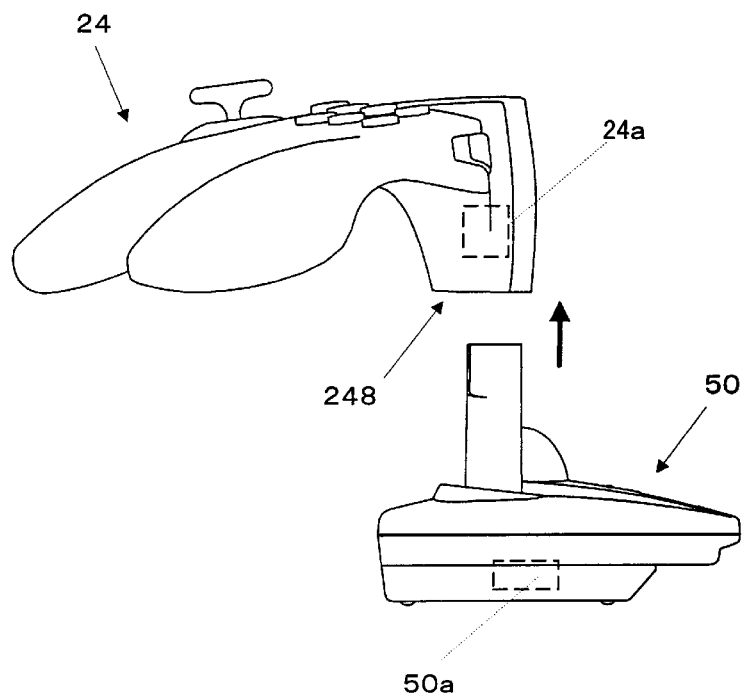
FIG. 7 is a side view showing a state before connecting the extension adapter to a controller.
Figure 8:
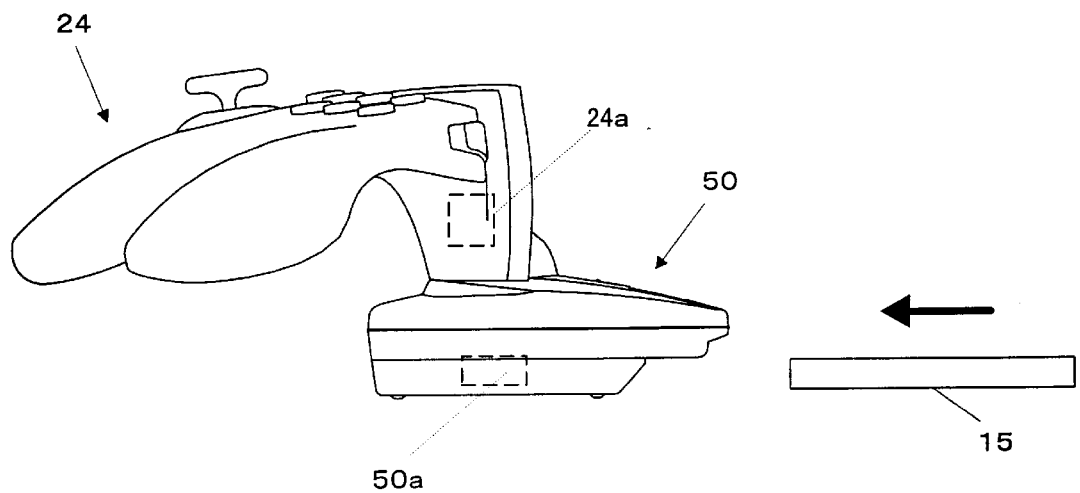
FIG. 8 is a side view showing a state that a first-machine game cartridge is attached to the extension adapter and the extension adapter is mounted on the controller.

As shown in FIG. 7, the extension adapter 50 is inserted into the insertion hole 248 at the backside of the controller 24 thereby connecting its connection circuit board 53 to the connector 24a. Then, a cartridge 15 is inserted from the rear of the controller 24 into the insertion aperture 55 as shown in FIG. 8, so that a circuit board (not shown) in the cartridge 15 is brought into connection to the connector 50a. This allows the backup data memorized on the RAM 15b of the cartridge 15 to be transferred to the second-machine 20 via the extension adapter 50 and the controller 24.

In this manner, the extension adapter 50 is in the T-formed exterior to have the insertion projection 52 to be inserted into the insertion hole 248 formed at the backside of the controller 24. Due to this, the controller 24 attached with the extension adapter 50, when rested, takes an almost horizontal position. Thus, the controller 24 is stable in rest position, that is, the controller 24 is easy to manipulate even when it is placed on a table or pedestal.

Further, the connection of the cartridge 15 to the controller 15 is made using the extension adapter 50. Due to this, even when the second-machine 20 is distantly located from the player (e.g., near to a TV receiver 40), the player positioned where the controller 24 is at his hand can easily connect (attach/detach) the cartridge 15.

Figure 9:
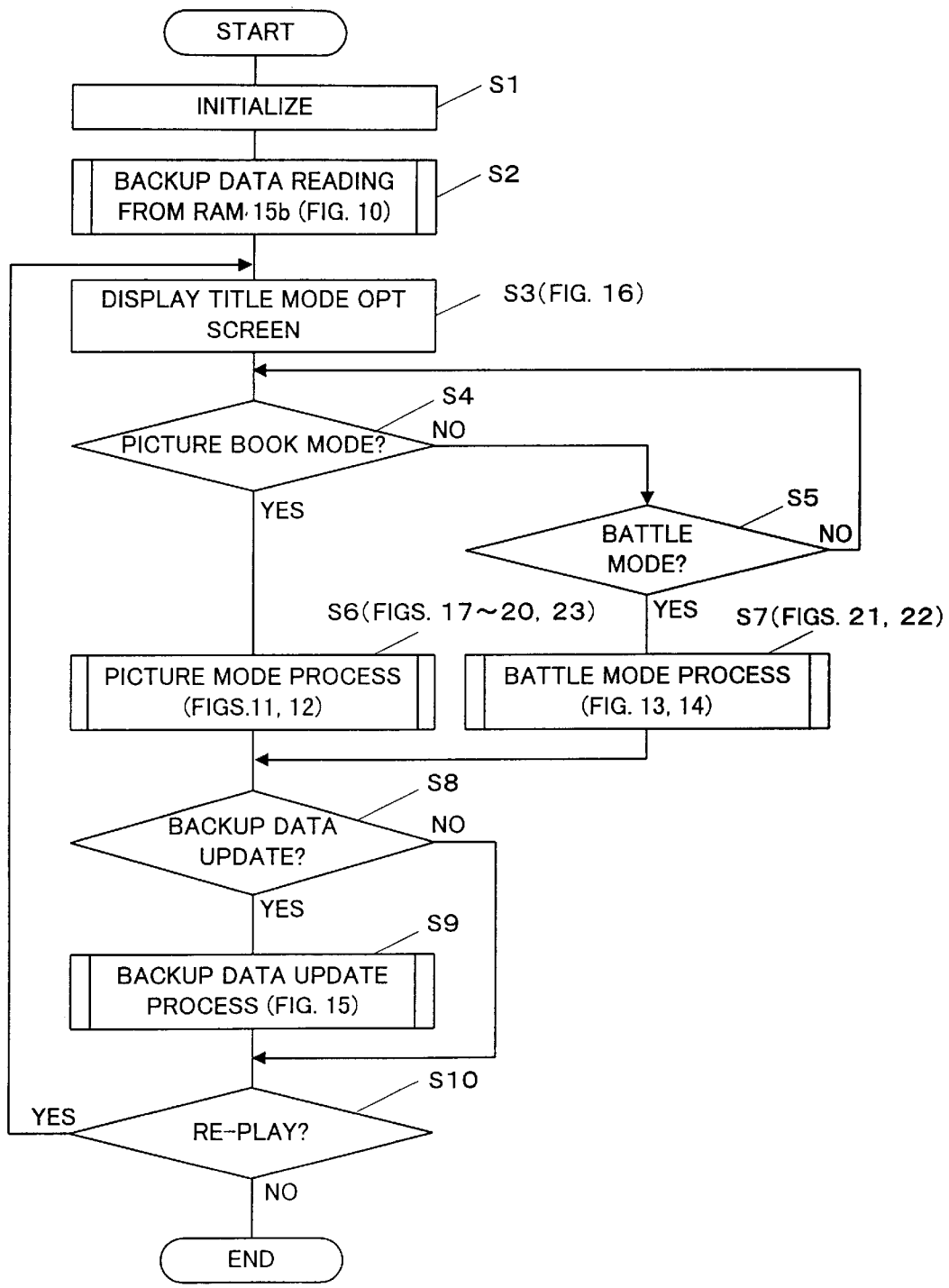
FIG. 9 is a main routine flowchart according to one embodiment of the present invention.

Referring to FIG. 9, there is shown a main flowchart for explaining the operation of the game system of the invention. FIG. 10 through FIG. 15 are subroutine flowcharts each showing a detail of a certain step of the main flowchart. Note that, in FIG. 9, the subroutine-flowchart figure No. is given in parentheses within a corresponding step S box, while the figure No. of illustrating an on-screen display example by the step is given at beside the relevant step No. outside the box.

Now explanations will be made on an outline of the game system of this embodiment with reference to the FIG. 9 flowchart and on-screen display examples for the corresponding steps. Prior to starting a game, preparations are made by attaching a cartridge 15 to the extension adapter 50 and connecting the extension adapter 50 to the controller 24 so that the controller 24 is in connection to the connector 23b of the second-machine 20. It is herein assumed that the player has played the game with a game cartridge 15, that has a certain bearing on a second-machine cartridge 25, attached to the first-machine 10, and acquired a plurality of monsters, wherein the monster names (or acquired character codes) and monster-by-monster basis capability data have been memorized in the RAM 15b. Some player may have memorized the data of capability enhanced by training the monster. It is also assumed that, where two users or players compete with each other, a first player uses a controller 24A and a second player a controller 24B.

Now if a power switch 192 is turned on, the main routine of FIG. 9 is started. That is, the CPU 21 of the second-machine 20 executes the following processes according to the program data memorized on the ROM 25a (or magnetic disc 35) in the cartridge 25.

Figure 16:
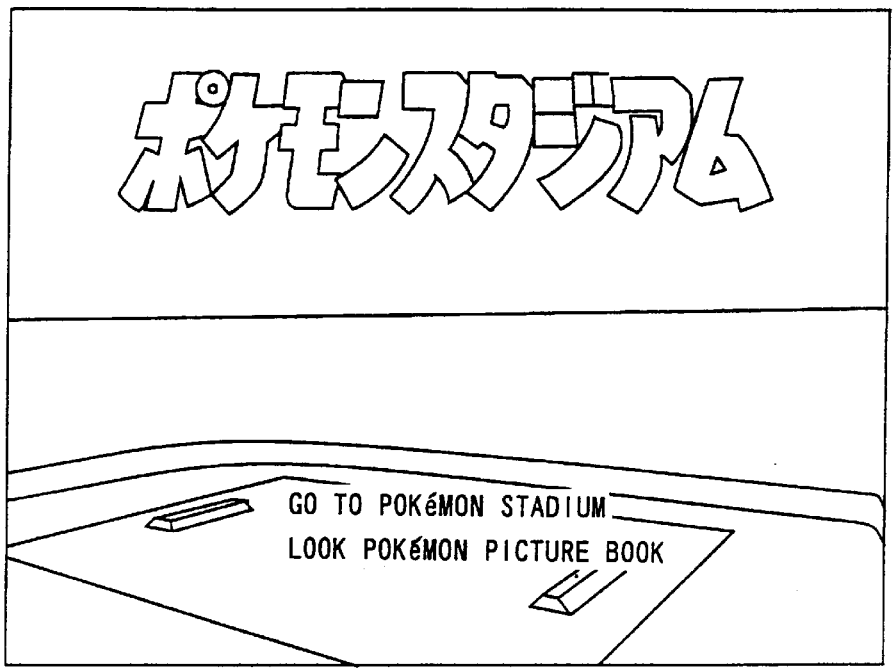
FIG. 16 is an example of display of a title screen.

At a step S1 an initializing process is performed. The initializing process is to write initial data into or clear off the memory areas, for example, of the external RAM 26 and the V-RAM 28 of the second-machine 20. The RAM 26 at all the memory areas is cleared off. At a step S2 a process is executed to read the backup data memorized in the RAM 15b. This read process will be explained later in greater detail with reference to FIG. 10. At a step S3 a game title and an operation-mode opting screen (see FIG. 16) are displayed. On this occasion, the player will opt either one of a "consult picture book" mode to look over the kinds or details of monsters caught during playing the game and a "combat mode" to make battle the own-captured monster and another-player-captured monster with each other (or go to a stadium), wherein the monsters have been acquired by playing the game. At a next step S4 it is determined whether a picture book mode is selected or not. If the picture book mode is not selected, then it is determined at a next step S5 whether in a combat mode or not. If neither the picture book mode nor the combat mode is selected is determined, the process returns to the step S4 to wait for any mode selection.

If the player operates the direction instruct switch 242 to move the cursor and depresses a switch for instructing command selection (e.g. 244a), it is determined that the picture book mode is selected, and the process advances to a step S6. At the step S6 a picture book mode process is executed which process is detailed in FIG. 11 and FIG. 12 to be referred to later.

Meanwhile, if a combat mode is opted by the player, this fact is determined at a step S5, and the process advances to a step S7. At the step S7 a combat mode process is executed which process is detailed in FIG. 13 and FIG. 14 to be referred to later.

After processing the step S6 or S7, it is determined at a step S8 whether in a backup data updating process or not. This determination is made depending, for example, upon if the switch 246 has been depressed or not. At a succeeding step S9 a backup data updating process is performed. For example, the backup data memorized in a backup data memory area 261–264 corresponding to a controller 24A–24D (i.e., attached with an extension adapter 50 and cartridge 15) for which the flag Fa–Fd is written by logical "1" in the flag area 265 is transferred to the corresponding controller 24A–24D and written into a RAM 15b of a cartridge 15 in connection to the relevant controller. At a step S10 it is determined whether re-play has been instructed or not. This determination is made depending upon if the switch 245 has been depressed or not. If a re-play is determined, the process returns to the step S3 to repeat the operations of the steps S3–S10. If a re-play is not made in a predetermined time or the power switch 192 is turned off, the game operation on the second-machine 20 is ended.

Now explanations will be made on the details of the steps S2, S6 and S7 of the main flowchart of FIG. 9 (i.e., detailed subroutines of these steps S2, S6 and S7).

Figure 10:
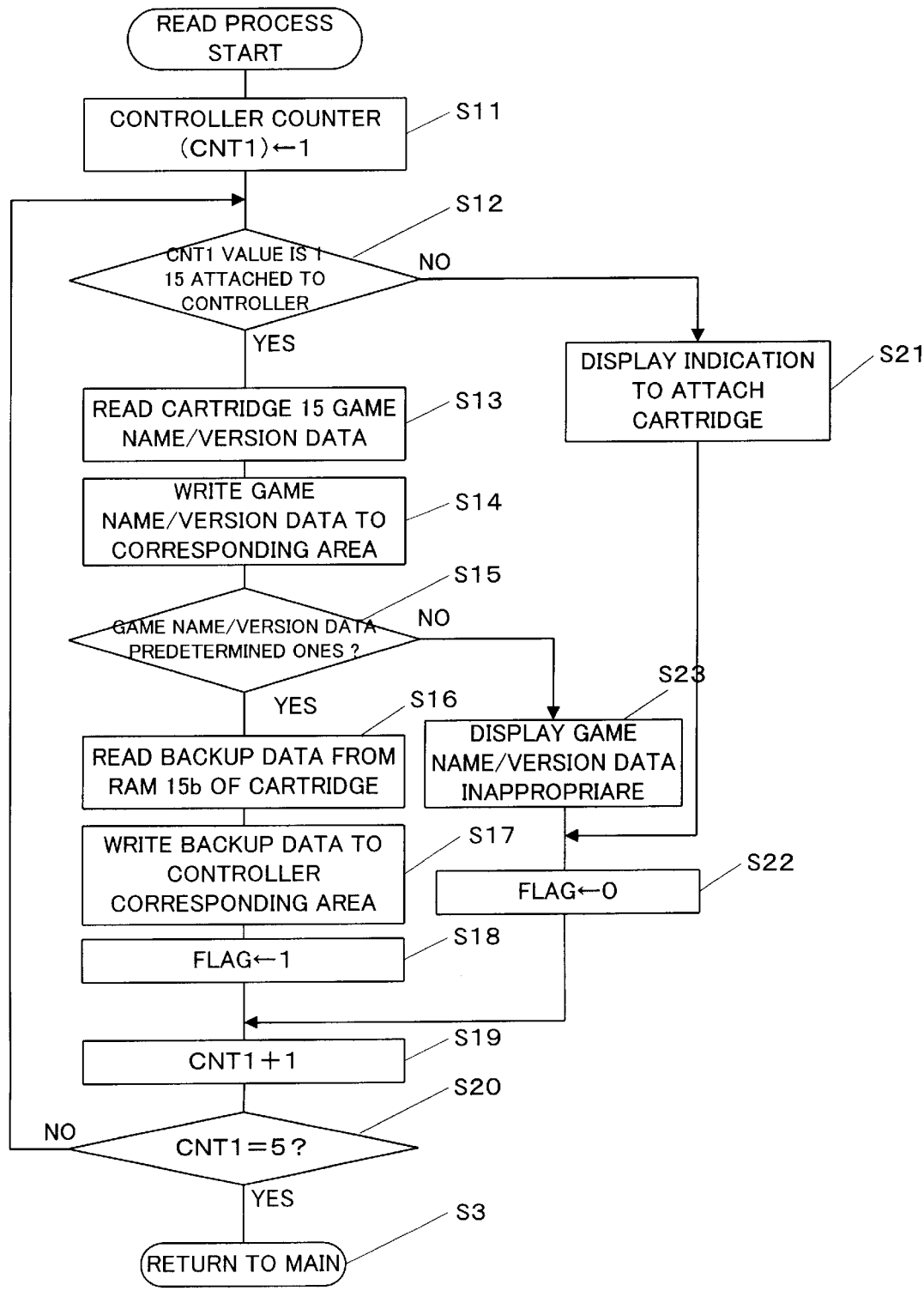
FIG. 10 is a subroutine flowchart of a reading process.

The read process of the step S2 is carried out by executing a read process subroutine shown in FIG. 10. At a step S11 a numeral "1" is first set in the counter (denoted by an abbreviation CNT 1) in order to determine as to which controller backup data is to be read out. In this case, the numeral "1" means the backup data reading from a first-player controller 24A. At a step S12 it is determined whether or not a first-machine cartridge 15 is attached to the controller (24A at the beginning) corresponding to the value of the counter CNT1. If the cartridge 15 is attached is determined, the process advances to a step S13. At the step S13 a game name and version data of the cartridge 15 attached to the controller 24A are read from the ROM 15a. At a step S14 the game name and version data thus read are written into the corresponding memory area 261 to the controller 24A (for the first player). At a step S15 it is determined whether the read game name and version data are predetermined ones or not. This determination is to confirm that a second-machine cartridge 25 or disc 35 now being playable is in a predetermined relationship to the cartridge 15 and that an associated game or motion can be effected by using the cartridge 15. If the game name and the version data are determined as predetermined ones, then at a next step S16 the backup data (e.g., captured character codes, captured-character-basis capability data, etc.) memorized in the RAM 15b of the cartridge 15 being connected to the controller 24A through the extension adapter 50 is written into the memory area 261 of the RAM 26. Thereafter, at a step S18 logical "1" is written on the flag Fa corresponding to the controller 24A to memorize that the controller 24A is being used. At a step S19 the counter CNT1 is added by "1" (CNT 1 count value at this time is 2). This specifies that the backup data is to be read at a next time from the second player's controller (24B). It is determined at a step S20 whether the count value of the counter CNT1 is 5 or not. If not 5 is determined, the process returns to the step S12 mentioned before. When the count value of the CNT1 becomes 5 by four-times repetition of the step S12–20 operations, the backup data in a connected one of the first-to-fourth player's cartridges 15 is read out.

Where the third and fourth player's controllers 24C, 24D are not connected with an extension adapter 50 or where they are connected with an extension adapter 50 but no cartridge 15 is attached thereto, this fact is determined at the step S12, and the process advances to a step S21. At the step S21 a message is displayed indicating that a cartridge 15 should be attached to an adapter 50 for the controller 24C, 24D. Thereafter, at a step S22 the flags Fc, Fd for the third and fourth player's controllers 24C, 24D are written by "0" thereby memorizing that the controllers 24C, 24D are not being used. Then the process advances to the step S19.

If it is determined at the step S15 that the game name and the version data are not predetermined ones, then display is made at a step S23 to show that the game name and/or version data is inappropriate thus indicating to attach a normal cartridge specified as adaptable for the present game system.

Figure 11:
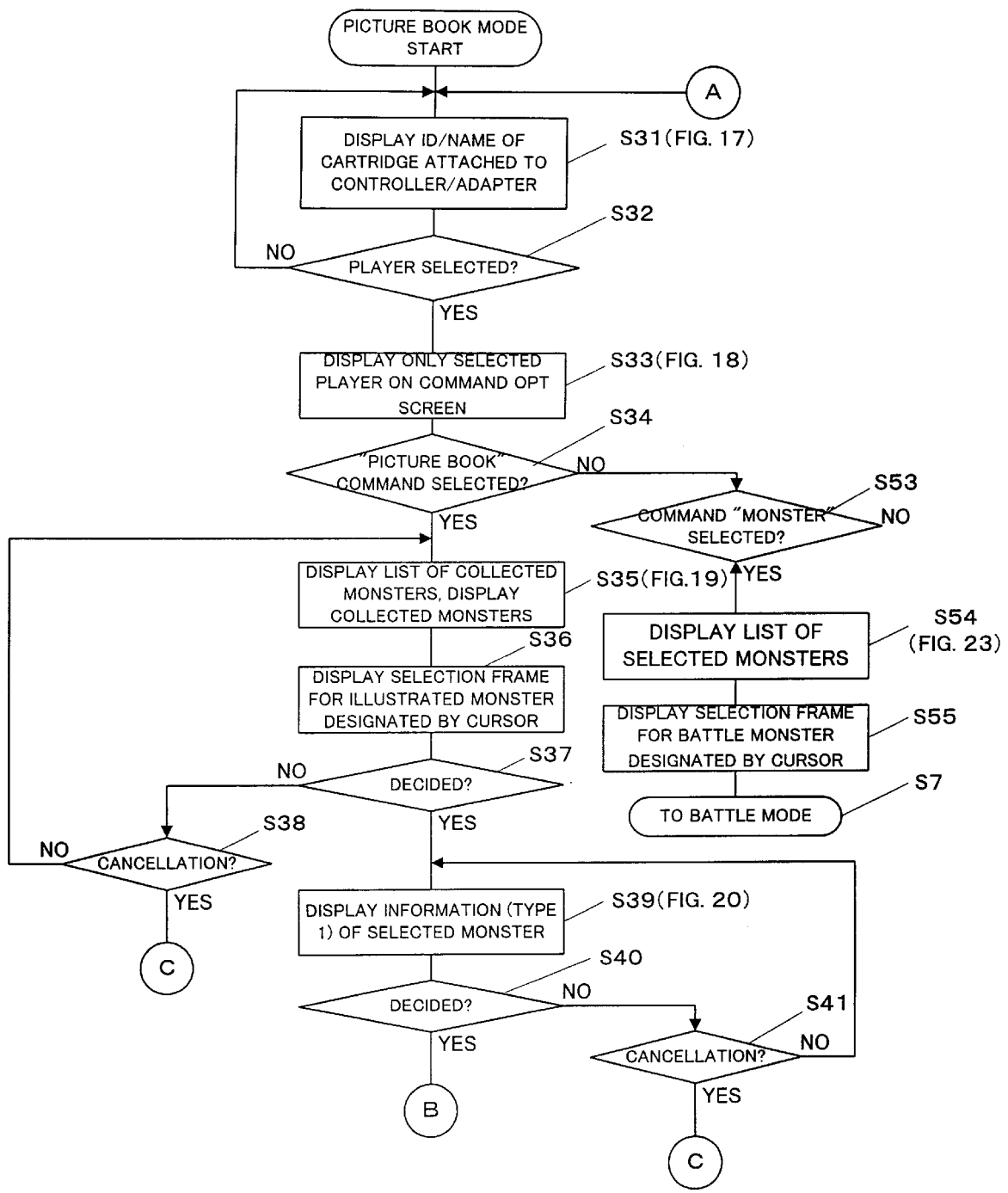
FIG. 11 is a subroutine flowchart of a picture book mode.
Figure 12:
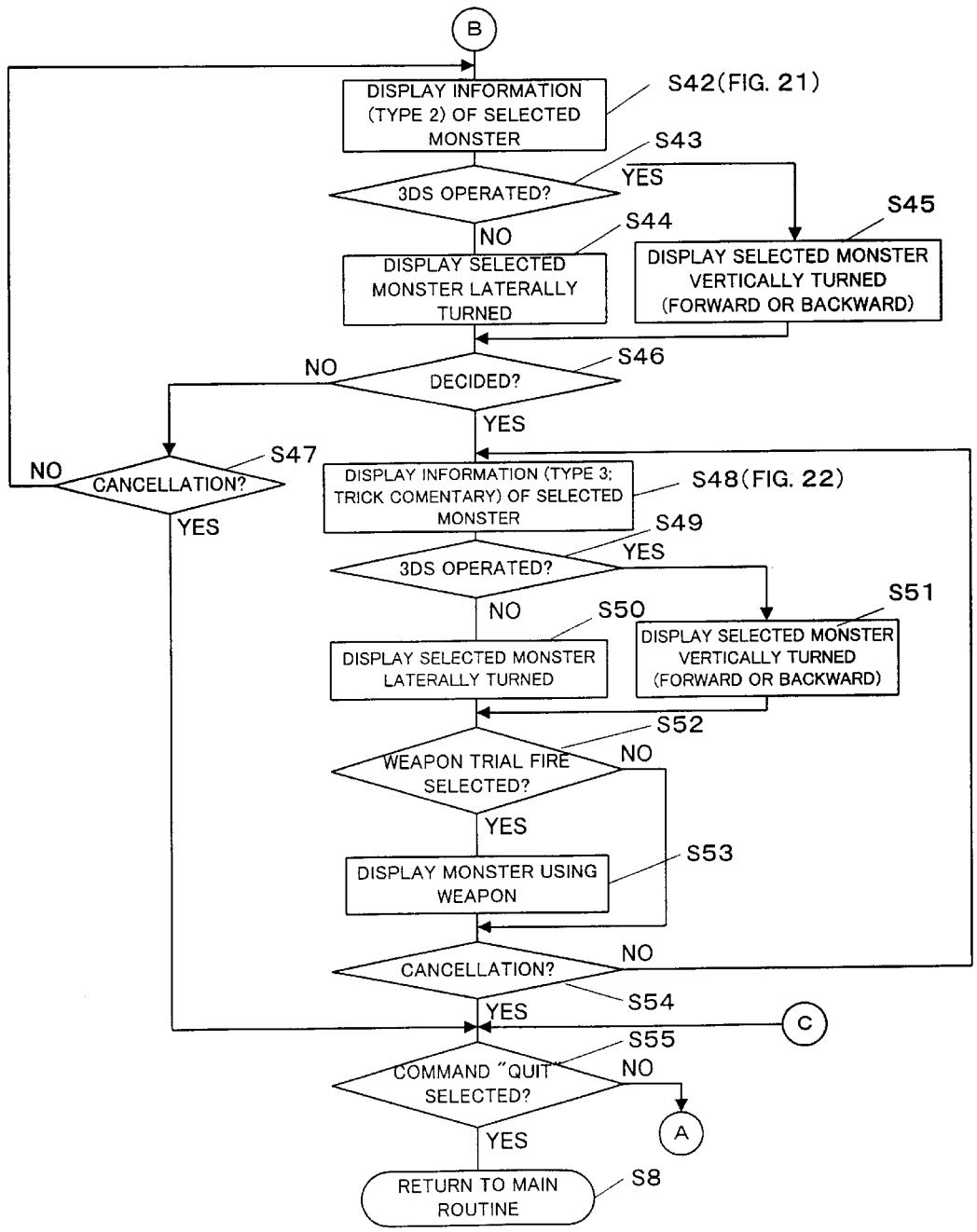
FIG. 12 is a subroutine flowchart of the picture book mode.
Figure 17:
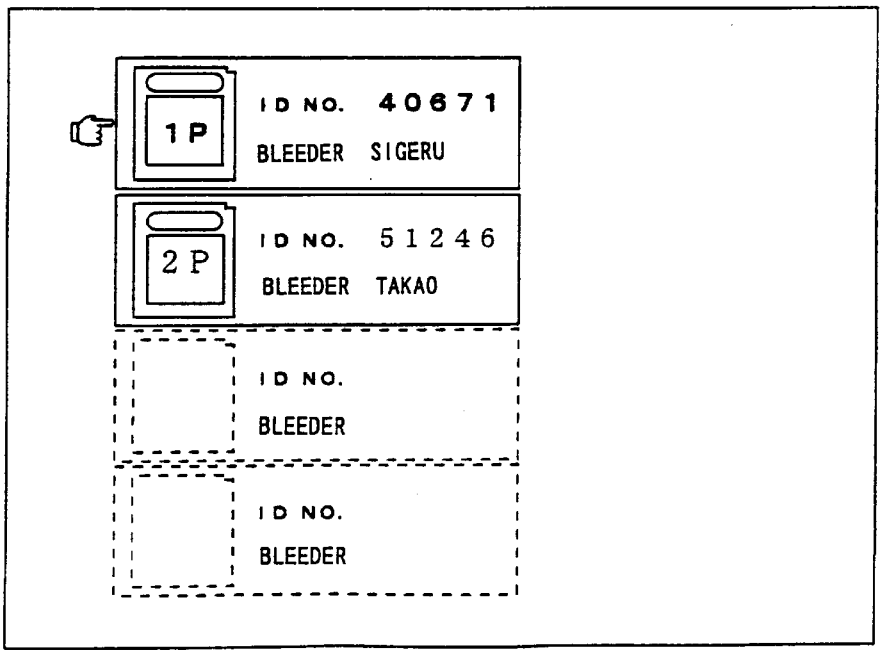
FIG. 17 is a view showing an example of displaying identification codes (ID codes) and names of one player or more in the picture book mode.
Figure 18:
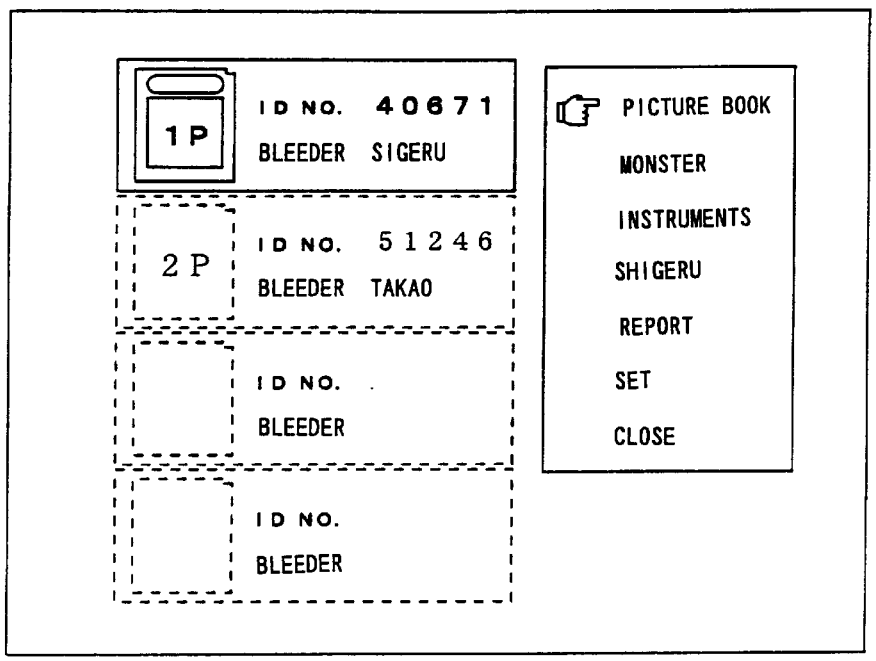
FIG. 18 is a view showing an example of displaying a command input state wherein one player is selected in the picture book mode.

The picture book mode process at the aforethe step S6 is carried out by executing the subroutine shown in FIGS. 11 and 12. That is, at a step S31 display is made as shown in FIG. 17 as to the identification code (ID code) and name of a cartridge 15 being attached to an extension adapter 50 on any of the controllers 24A–24D for the respective first to fourth players. At this time, the controller (e.g., 24C, 24D) not being attached with an extension adapter 50 or cartridge 15 are not displayed of use (cartridge 15 shape is not displayed) in order to make clear its out-of-use, and further the identification code and name inherent to an owner of the cartridge 15 are not displayed. At a step S32 it is determined whether a player has been selected or not. This determination is made by judging on the movement of the cursor (hand-shaped mark) to a first player's mark due to depression of the direction instruct switch 242 and on the depression of the switch 244a. However, where the second-machine 20 is connected with the controllers of a plurality of players (e.g., 24A, 24B), the players corresponding to the flags Fa–Fd memorizing "1" are determined, in order, as to the presence or absence of selection. At a step S33 display is made of a command-opting screen only for the selected player (see FIG. 18). At this time, the player whose cartridge 15 identification code and owner name are being displayed can move the cursor to select a desired command from the command being displayed on the right side of the screen, and determine the selection by depressing the switch 244a.

Figure 19:
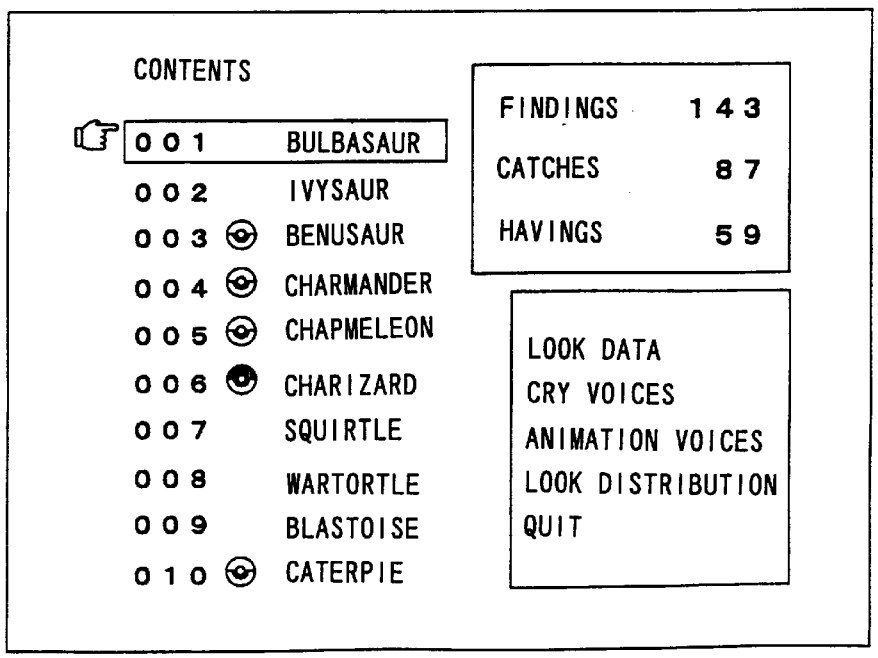
FIG. 19 is a view showing an example of displaying a list of captured monsters in the picture book mode.

If "picture book" is selected, then at a step S35 a list of acquired (or collected) monsters is displayed as shown in FIG. 19. The data on the acquired monsters (e.g., the number of findings, the number of captures, the number of possessions, etc.) is displayed. At this time, the player can move the cursor to opt a monster he desires to know, and depress the switch 244a. This provides display of monster names through which detailed data can be displayed, together with marks, such as blocks or cursors, indicative of a selection state, as shown in FIG. 19. At a step S37 the selection-decision switch 244a is depressed or not is determined. If not selection-decision is determined, at a step S38 it is determined by depressing the switch 244b whether cancellation is selected or not. If none of the switches are operated, the process returns to the step S35 to repeat the steps S35–38, thus waiting for selecting either one of selection-decision or cancellation.

Figure 20:
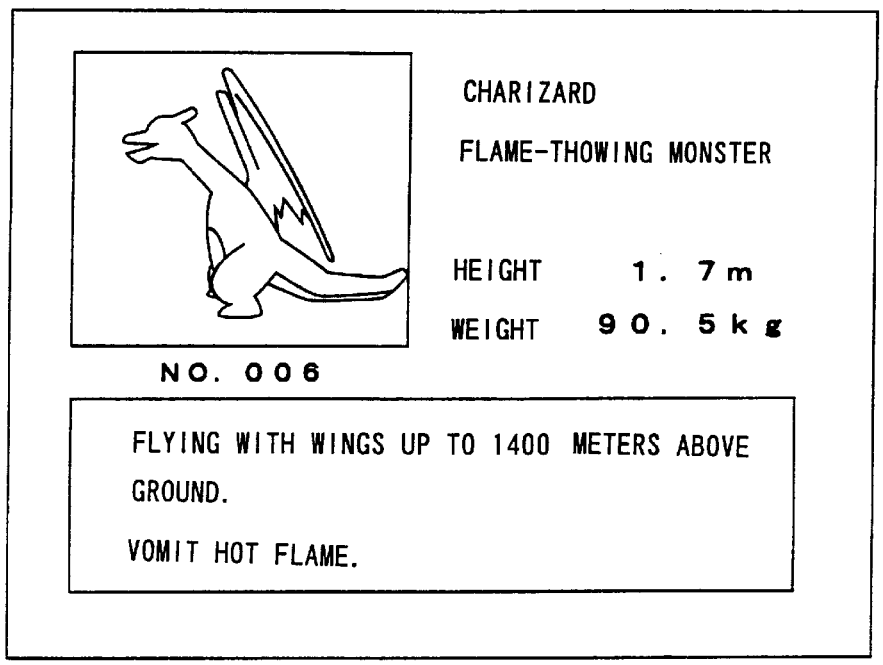
FIG. 20 is a view showing an example of displaying information on one monster (type 1) selected in the picture book mode.

If it is determined that selection-decision is made, then at a step S39 the information on the selected monster is displayed in a type-1 display form as shown in FIG. 20. This type-1 form of monster information includes a name of the selected monster and its appearance as viewed in a certain direction (e.g., side-viewed shape, weight, height, features of the monster, etc. in the illustration). Then, at a step S40 it is again determined that the selection has been decided or not. If not decided, it is determined at a step S41 whether cancellation has been made or not. If neither is selected, the process returns to the step S39.

Figure 21:
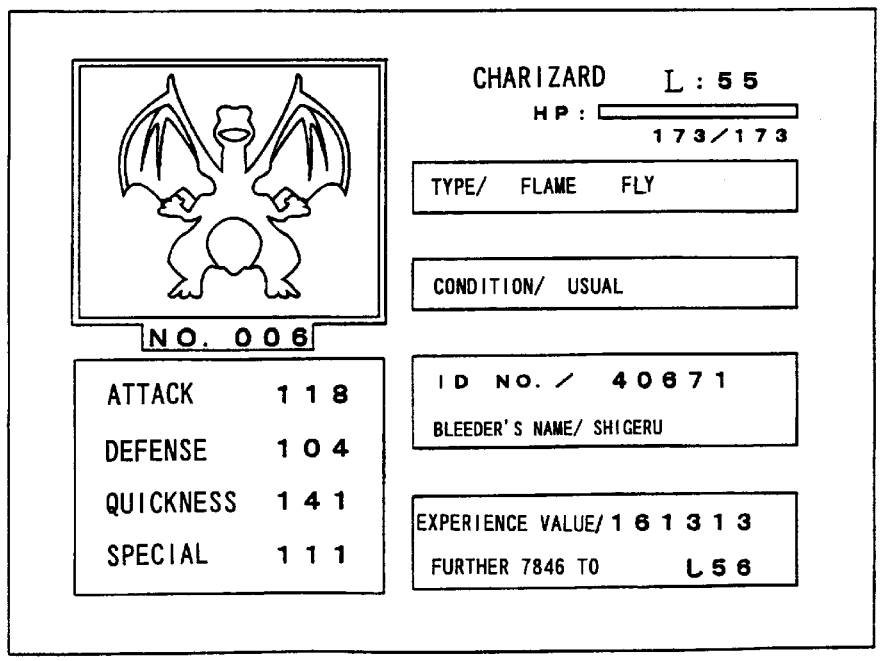
FIG. 21 is a view showing an example of displaying information on the monster (type 2) selected in the picture book mode.

If opting the decision, then at a next step S42 the information of the selected monster is displayed in a type-2 form (see FIG. 21). This type-2 information display includes, in addition to for example monster name, a shape as viewed at another angle, the monster's capability data (strike power, defensive power, quickness, special abilities), etc. In a state of type-2 information display, it is determined whether the player is manipulating the analog joystick 243 or not. If the analog joystick 243 is not operated, then at a step S44 the monster in display is laterally turned. Due to this, the operator can look the entire body of the monster he selected and know physical features of the monster.

On the other hand, if it is determined that the analog joystick 243 is operated upward or downward, the process advances to a step S45. At the step S45 the monster is vertically turned (frontward or rearward) in display in response to upward or downward tilt of the analog joystick 243. This allows the player to know concrete physical features concerning the monster and recognize how the features are to be reflected in a battle against a competitor's monster. After the step S44 or S45, the process advances to a next step S46. At the step S46 it is again determined whether selection-decision has been opted or not. If the decision has been not opted, then at a step S47 it is determined whether cancellation is selected or not. If neither has been selected, the process returns to the step S42 to repeat the operations of the steps S42–S47.

Figure 22:
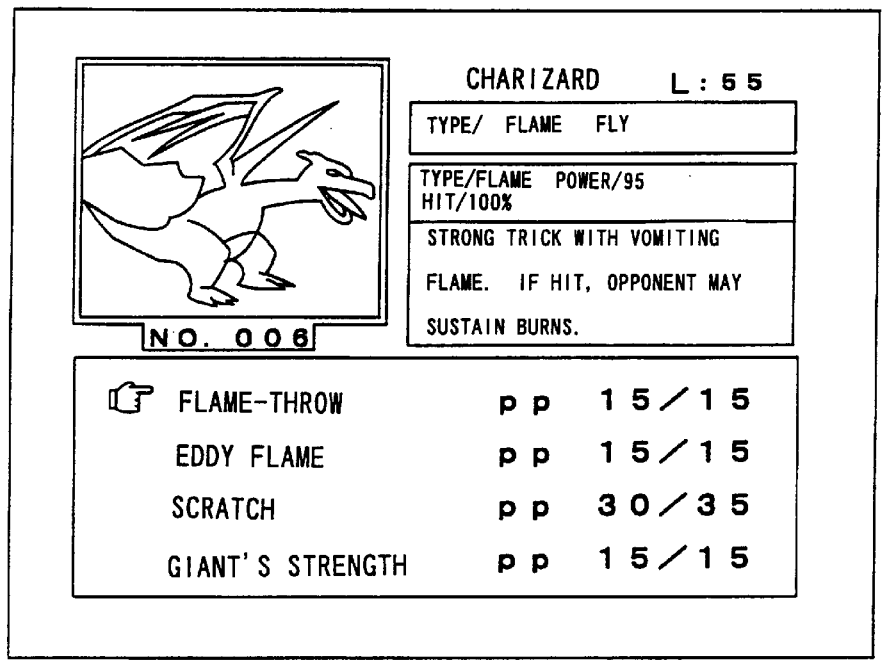
FIG. 22 is a view showing an example of information on the monster (type 3; with commentaries about tricks) selected in the picture mode.
Figure 23:
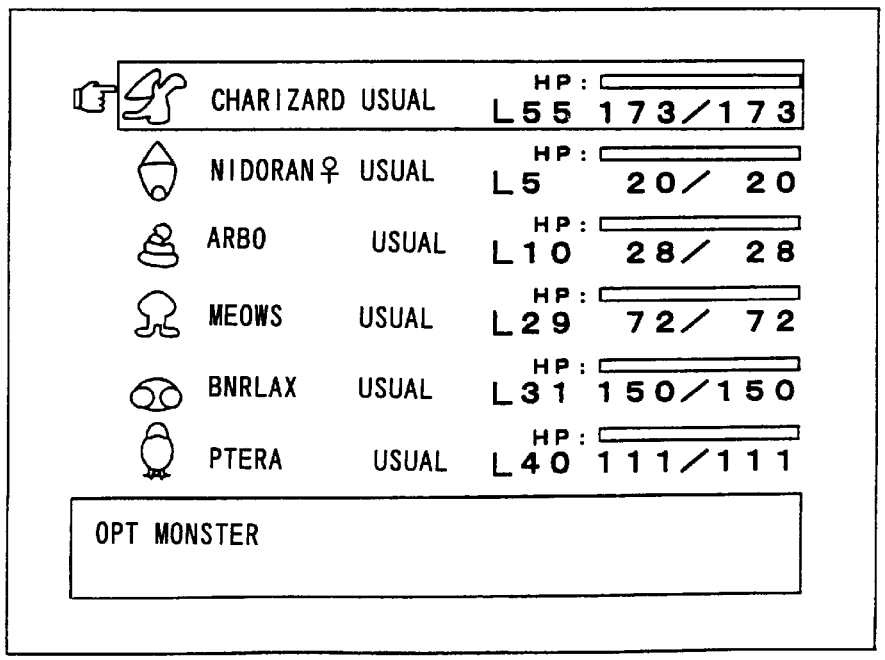
FIG. 23 is a view showing an example of displaying hit-point data and capability data of a plurality (six) of monsters selected for battling in the battle mode.
Figure 24:
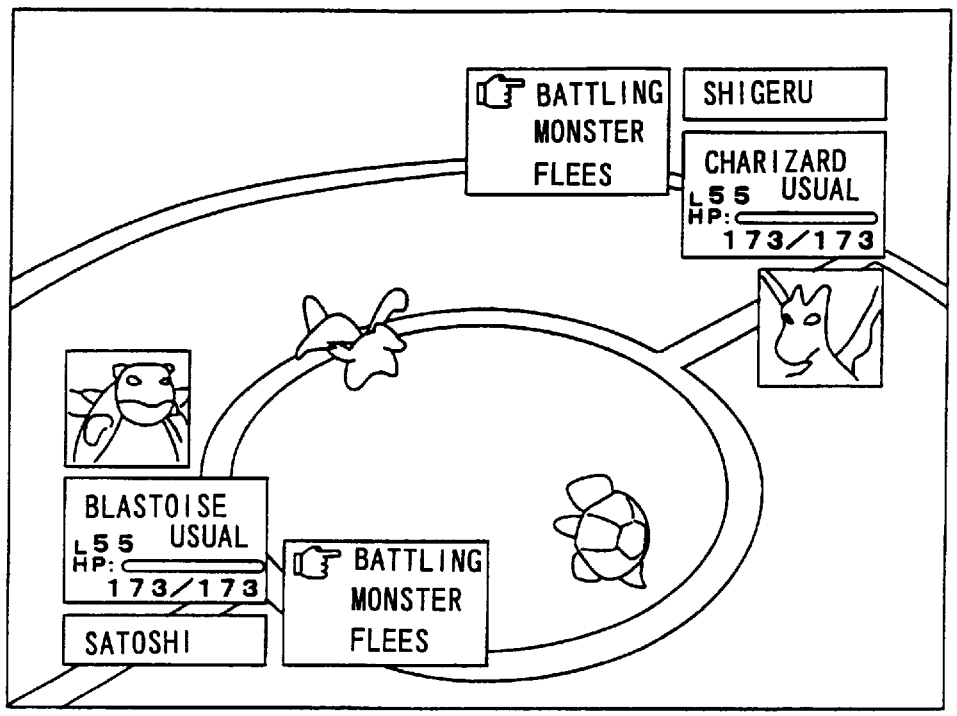
FIG. 24 is a view showing a scene battling between the respective monsters of the first and second players in the battle mode.

If decision is selected at the aforesaid step S46, then at a next step S48 the selected monster is displayed of information in a type-3 form (see FIG. 22). The type-3 information display includes kinds of weapons available and damage to the competitor by the weapon or hit-point amount as well as comments on the feature of the weapon selected by the cursor.

At next steps S49, S50 and S51, operations similar to those explained in the steps S43, S44 and S45 are effected in response to a manipulation state of the analog joystick 243. At a next step S52 it is determined that trial fire by (or attempting launch with) the weapon has been selected or not. This determination is made by moving the cursor to opt a weapon and then depressing the switch 244a to designate the weapon. If selecting such weapon trial fire, then at a step S53 the monster using the selected weapon is displayed at upper left of the screen. Thereafter it is determined whether the switch 244b for designating cancellation has been depressed or not. If cancellation has not been selected, the process returns to the step S48. If cancellation has been selected, the monster list display state shown in FIG. 19 is returned. In the list display state, if a command "quit" is opted, this fact is determined at a step S55, and the process returns to the step S8 of the main routine. Thus the picture book mode is ended.

Figure 13:
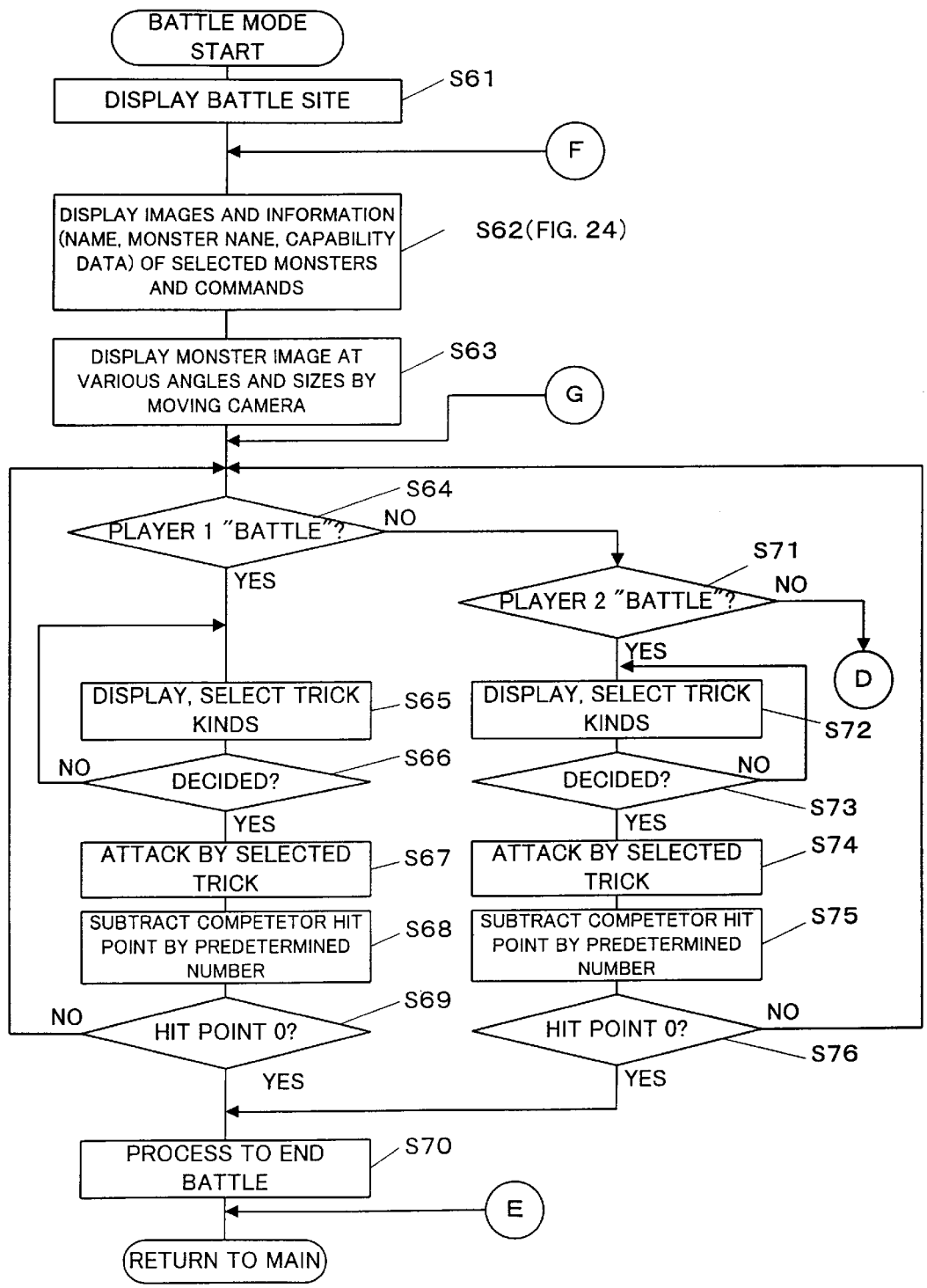
FIG. 13 is a subroutine flowchart of an attack mode.
Figure 14:
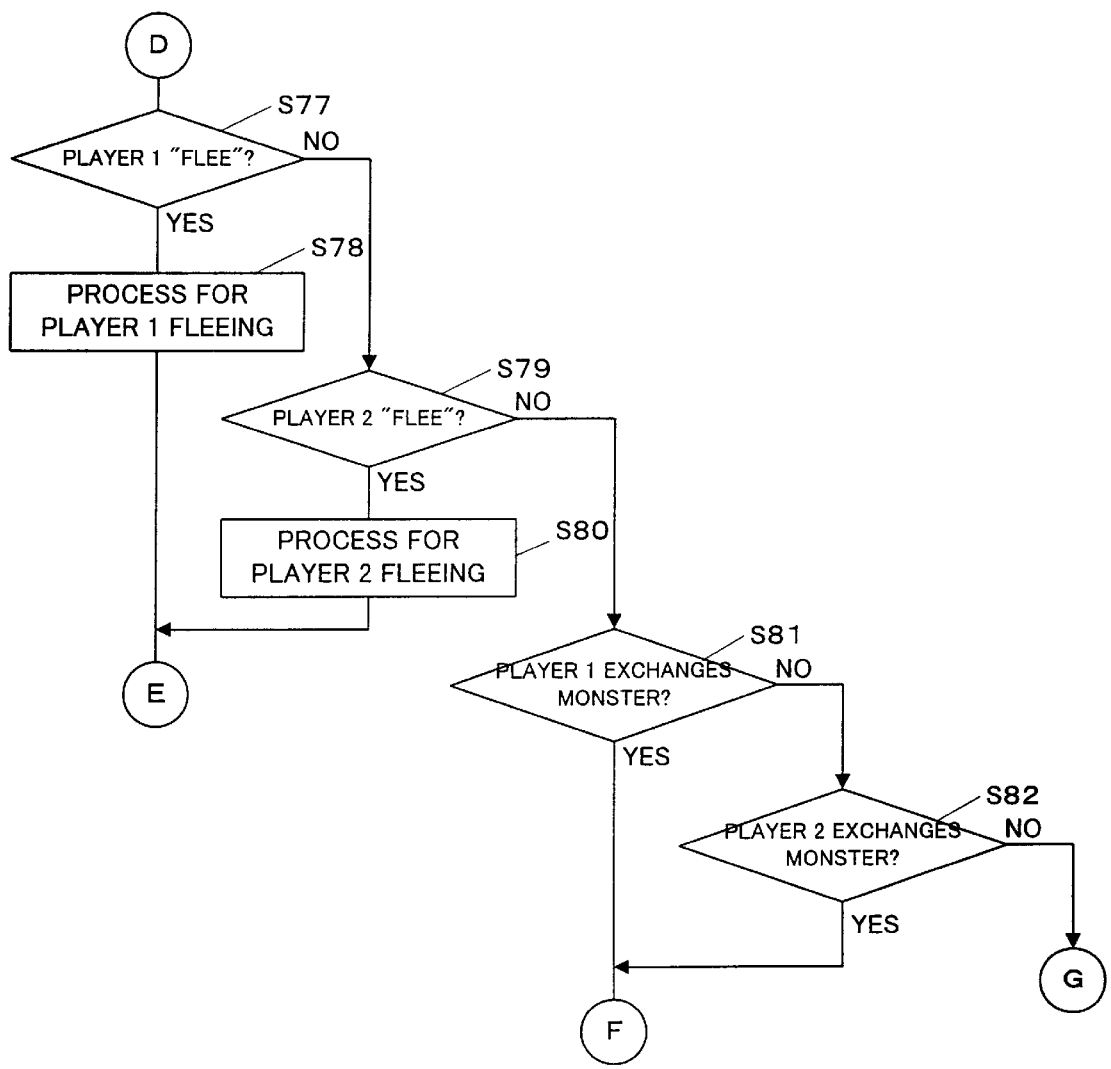
FIG. 14 is a subroutine flowchart of the attack mode.

Now explanations will be made on the detail of the battle mode at the step S7 of the main routine, based on a subroutine shown in FIGS. 13 and 14. If a battle mode is started, a battle site is displayed at a step S61. At a step S62 display is made of two monster images selected by two players, various information contents (e.g., monster names, player names, monster capability data, etc.) and commands are available in the battle mode (e.g., to attack, monster, to flee, etc.). Simultaneously, the hit-point data (or defensive capability) of the monsters one of which was opted by each of the two players are respectively stored in the registers 267, 268. At this time, if any one of the players operates the analog joystick 243, then at a step S63 image data is generated for display on the screen such that the monster is displayed at angle and/or in size varied while moving the camera, in response to operating state thereof. Such image representation is achieved by calculating data of a plurality of polygons for a monster based on the positional relationship between the polygon data and the camera and putting textures to the calculated polygons.

At a step S64 it is determined whether the first player has opted "battle" or not. If the player has selected "battle", then at a step S65 display is made on kinds of tricks available with the monster selected by the player 1. If the player selects a trick, trick select-decision is made is determined at a step S66. At a step S68 subtraction is made of the hit point corresponding to a damage to the opponent by attack from the hit point of the opposite player stored on the register 268. The remaining hit point data is written into the register 268. At a step S69 it is determined whether the hit point for each of the two players has reached zero or not. If neither player's hit point is not zero is determined, the process returns to the step S64.

Where the second player has opted the command "battle", actions are effected by steps S71, S72, S73, S74, S75 and S76, wherein the motions are similar to those of the steps S64–S69 as were explained. Nevertheless, the opponent hit-point subtraction process at a step S75 is made by subtracting strike power determined by the weapon used from the hit point of the first player stored in the register 267.

At the steps S69 and S76, if it is determined that the hit point of any of the players becomes zero, a process for ending the battle operation (e.g., erasing the code of a defeated monster, etc.) is effected, and then the process returns to the step S8. The monster codes and capability data, owned for each of the first and second players after ending the fighting, is update-stored as backup data into the memory area 261, 262. Accordingly, the backup data updated by the backup-data updating process at the aforesaid step S9 is update-written over the RAM 15b of the corresponding player's cartridge 15.

On the other hand, if it is determined that any player have not opted the command "battle", it is then determined at a step S77 whether the player 1 has opted "flee" or not. If the player 1 has selected fleeing, then display is made at a step S78 such that the monster of the player 1 flees from the battle site, and then the process advances to the main routine step S8. Meanwhile, when the player 2 has opted the command "free", display is made at a step S80 such that the monster of the player 2 runs away, and the process returns to the step S8. On the other hand, if the player 1 selects to change his monster, this fact is determined at a step S81, and the process returns to the step S62. Similarly, if the player 2 selects to change his monster, that fact is determined at a step S82, and the process returns to the step S62. Thus the combat mode process is carried out.

Now explanations will be made on the detail of the backup data updating process at the step S9 of the main routine, based on a subroutine flowchart shown in FIG. 15. In the backup data updating process, if only one player is playing on the second-machine 20, there is no possibility of causing such problems that another player's backup data be erroneously written over the RAM 15b of the own cartridge 15 or the own backup data be written by mistake onto the RAM 15b of another player's cartridge 15. However, there might be a case of being written over by another player's backup data where a plurality of players perform a battle play on the second-machine 20 with using the backup data memorized in their own cartridges 15 (or a memory-medium-integrated-type first-machine built with ROM 15a and RAM 15b). Such erroneous writing or updating backup data is prevented by the following process.

Figure 15:
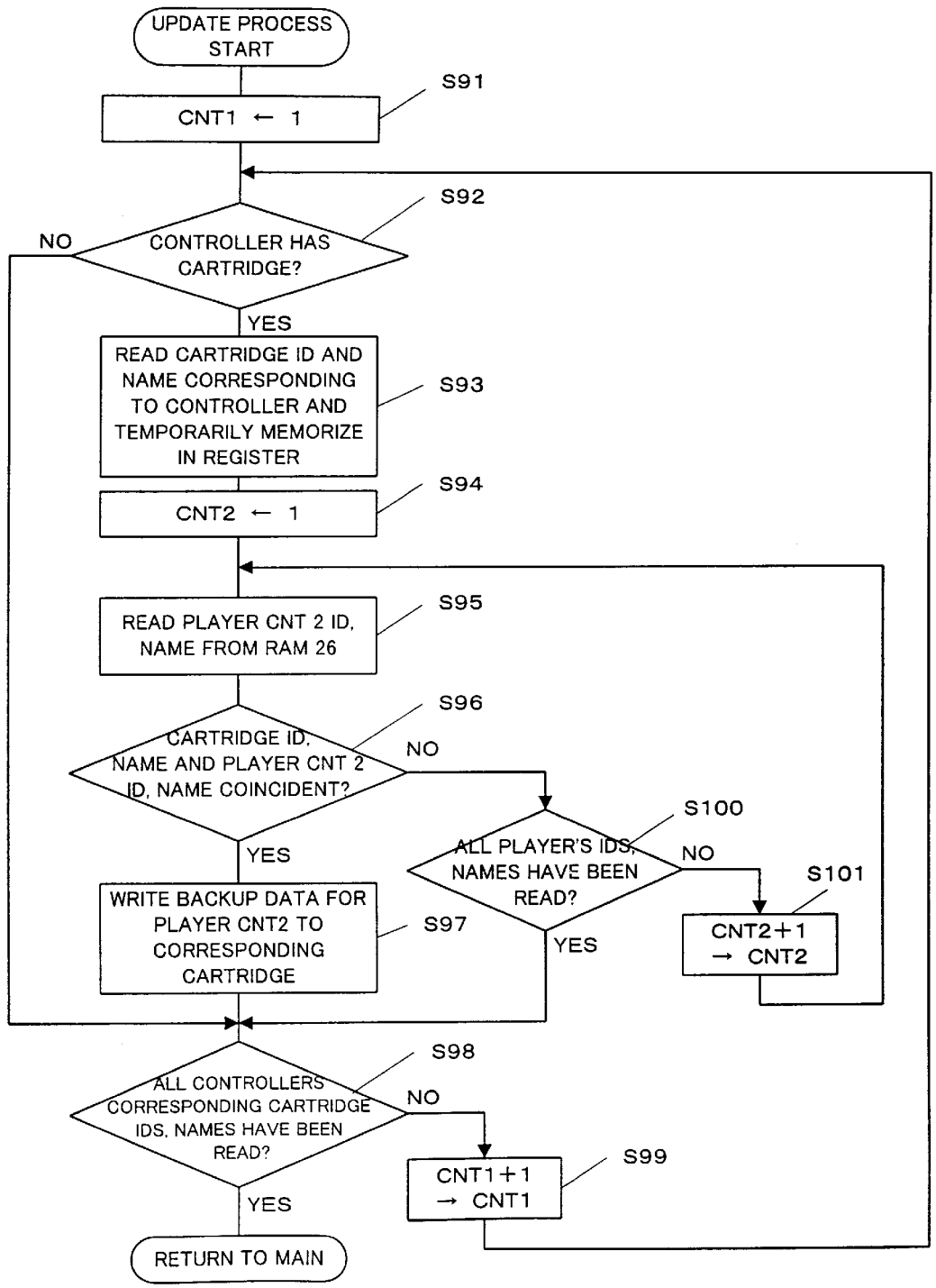
FIG. 15 is a subroutine flowchart of a backup data update mode.

That is, if the process is in updating backup data is determined at the step S8, then it advances to the step S9 to execute an updating process subroutine shown in FIG. 15. Specifically, at a step S91 a controller 24A is designated by setting a numeral "1" in a counter (CNT1 in the counter area 266) for designating a controller 24A–24D. It is determined at a step S92 whether a cartridge 15 is attached to the controller 24A designated by the counter CNT1 or not. If not attached, the process advances to a step S98 to be referred to later, while if attached the process advances to a step S93. At the step S93 the identification (ID) code and/or name data (hereinafter referred to as "ID code, etc.) memorized in the RAM 15b of the cartridge 15 attached to the controller 24A is read out and loaded onto a corresponding area in the RAM 26. At a step S94, by setting a numeral "1" in a counter (CNT2 in the counter area 266) for designating a player or memory area 261–264, a memory area 261 corresponding to the player 1 is designated from which the backup data is to be read out. At a step S95 ID code, etc. of the player 1 are read out of the memory area corresponding to the relevant player. At a step S96 comparison is made between the ID code, etc. of the cartridge 15 attached to the controller 24A and the ID code, etc. memorized in the memory area 261 to determine whether they are coincident with or not. If determined coincident, then at a step S97 the backup data memorized in the memory area (e.g., 261) corresponding to the count value of the counter CNT2 is transferred to and update-written over the RAM 15b within the cartridge 15 attached to the controller (e.g., 24A) corresponding to the count value of the counter CNT1, and then the process advances to a step S98. At the step S98, if it is determined that all the controller 24A–24D have not completed of determination as to the presence or absence of attaching a cartridge to a corresponding controller, then at a step S99 the counter CNT1 is added by 1 to designate a next controller (e.g., 24B). Then the process returns to the aforesaid step S92. The operations of the aforesaid steps S92–S99 or S95, S96, S100 and S101 are repeated.

Meanwhile, if determined not coincident at the aforesaid step S96, it is determined at a step S100 whether the all the players' ID codes, etc. have been read out or not. If it is determined that all the players' ID codes, etc. have not been read out, then at a step S101 the counter CNT2 is added by 1 to designate a memory area 262 for the player 2, and the process returns to the step S95. During the repetition of the steps S95, S96, S100 and S101, if there comes coincidence between the ID code, etc. read out of the cartridge 15 and the ID code, etc. read out of the memory area 261–264, then the process advances to a step S97. Also, in the aforesaid step S98 if all the controllers 24A–24D have been determined as to attachment of a cartridge corresponding thereto, the process returns to the main routine of FIG. 9.

In this manner, an identification code is memorized in each cartridge 15. When writing backup data in an update fashion, collation is made between the identification code of the cartridge being attached to the controller and the ID code corresponding to the backup data to be written over for update. If writing-over for update is made only when coincident, even when a plurality of players are playing at a same time on the second-machine 20, prevention is effectively given for a case that own backup data is written by mistake into another player's cartridge or own cartridge is written by another player's backup data.

When writing the backup data gained through playing on the second-machine 20 into a cartridge 15 attached to the controller 24, if both the code and the name data are utilized for checking, erroneous writing can be positively prevented. However, any one of the ID code and the name data may be used if exactness is not emphasized. Other data may be combined with the ID code, et. to collate between the cartridge such data has been read out and the cartridge to be written over for update.

Incidentally, in the above embodiments explanations were made for the case that the first-machine cartridge 15 and the second-machine cartridge 25 contain the monster capture-and-raise game and the battle game. However, the technological thought of the present invention is not limited to such games. It is needless to say that the invention is also applicable to various games, including roll playing games and sports games. In such a case, the programs for the first and second-machines 10, 20 differ in content depending upon game kinds, and the program with applicability therebetween may naturally differ depending thereupon.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A game system, comprising:
    a first processing system included in a first game machine, said first game machine being a portable game machine and including a first operation unit and a display;
    a first backup data memory for storing backup data obtained through processing a first game program stored in a first game program memory according to operation of said first operation unit by said first processing system, a game image of a first game executed by processing said first game program being displayed on said display;
    a second game machine having a second processing system, said second game machine being a video game machine connected to a separately provided display and including a second operation unit;
    a connector electrically connected to said first backup data memory and transferring the backup data to said second game machine;
    a second backup data memory provided in association with said second game machine and temporarily storing the backup data read through said connector out of said first backup data memory;
    a second game program memory provided in association with said second game machine and storing a second game program to be processed by said second processing system; and
    an association program memory provided in association with said second game machine and storing an association processing program to execute a process associated with the backup data to be processed by said second processing system, wherein
    said second processing system effects according to operation of said second operation unit a second game associated with the backup data and different from the first game by executing the second game program stored in said second game program memory based on the backup data stored in said second backup data memory and the association processing program, a game image of the second game being displayed on said separately provided display.

2. A game system according to claim 1, wherein said first backup data memory is incorporated in said first game machine, and said connector including a game machine connector for connecting said first game machine to said second processing system.

3. A game system according to claim 2, wherein said first game machine includes a first interface connected to said first processing system, said first backup data memory being connected to said first interface, said second game machine including a second interface connected to said second processing system, and said game machine connector including a connector for connecting said first interface to said second interface.

4. A game system according to claim 3, wherein said first backup data memory includes a first external memory medium that is attachable to and detachable from said first game machine, and wherein said connector includes a memory medium connector for connecting said first external memory medium to said second processing system.

5. A game system according to claim 4, further comprising a controller provided in association with said second game machine and connected to said second processing system, wherein said memory medium connection means includes an adapter for connecting said first external memory medium to said controller.

6. A game system according to claim 5, wherein said adapter includes a first connector provided on said controller and a second connector connected to said first connector and to said first external memory medium.

7. A game system according to claim 1, including a first memory media wherein said first game program memory and said first backup data memory are formed at different areas in said first memory media.

8. A game system according to claim 7, wherein said first memory media includes a non-volatile memory.

9. A game system according to claim 1, wherein said first program memory and said first backup data memory respectively include individual memory media.

10. A game system according to claim 1, wherein said second game program memory and said second backup data memory are formed at different areas in said second memory.

11. A game system according to claim 10, wherein said second memory includes a non-volatile memory.

12. A game system according to claim 1, wherein said second game program memory and said second backup data memory respectively include individual memory media.

13. A game system according to claim 1, further comprising at least one first identification information holding location for holding first identification information in association with said first backup data memory, said game system is operable to determine based on said first identification information whether the backup data of said first backup data memory is usable or not.

14. A game system according to claim 13, wherein said game system is operable to generate a notification of an inapplicability when the backup data is not-usable.

15. A game system according to claim 14, wherein the first identification information includes a game title of the first game program.

16. A game system according to claim 15, wherein the first identification information includes version information relating to the first game program.

17. A game system according to claim 1, wherein said second processing system is operable to write the backup data read out by said second processing system into said second backup data memory.

18. A game system according to claim 17, wherein said second backup data memory includes a plurality of memory areas, wherein said second processing system is operable to specify said first backup data memory, and to write the backup data into one of said memory areas corresponding to said first backup data memory.

19. A game system according to claim 18, further including a plurality of access channels through which said plurality of memory areas are enabled to be accessed by said second processing system, and wherein said second processing system is operable to specify one of said access channels.

20. A game system according to claim 1, wherein said second game program memory stores a game program associated with the first game program as the second game program.

21. A game system according to claim 20, wherein the second game program includes a conversion program for rendering the first game program in a form processable by said second processing system.

22. A game system according to claim 21, wherein the conversion program includes an acceleration program according to which said second processing system can execute the first game program at a speed higher than a speed of execution of the first game program by said first processing system.

23. A game system according to claim 1, wherein the first game program includes at least a write program to store capability data representative of capability of a character to appear in a game into said first backup data memory, and
the second game program including a battle process program to effect a game process by using the capability data to cause battling with a character of another player on the second game.

24. A game system according to claim 1, wherein the first game program includes a program for displaying a two-dimension image character as an image for the game and a write program for storing a character code for specifying a character to appear in the game into said first backup data memory, and
the second game program including a program for displaying each character with polygons in a three-dimension image corresponding to a character code, displaying the character in the three-dimension image based on the character code.

25. A game system according to claim 9, wherein said second game machine includes a plurality of connectors to disconnectably connect a plurality of second operation units, said connector being provided on each of said plurality of operation units, and said second backup data memory including a plurality of memory areas corresponding to said plurality of operation units.

26. A game system according to claim 9, wherein said first backup data memory is given inherent identification information, further comprising an identification information display for displaying the identification information in said first backup data memory on said separately provided display when said first backup data memory is connected to connectors.

27. A game system according to claim 10, wherein an identification information display is formed on said separately provided display including a plurality of display regions corresponding to said plurality of connectors, and displays the identification information on a corresponding one of said plurality of display regions when said first backup data memory is set up on said second operation unit by said connectors.

28. A game system according to claim 10, wherein the identification information includes a name entered by a player who has played a first game which backup data has been stored in said first backup data memory.

29. A game system according to claim 11, wherein the identification information includes a name entered by a player who has played a first game which backup data has been stored in said first backup data memory.

30. A home video game system which uses the processing results of a first video game device having a first processing system for executing a first video game program comprising:
   a second video game device having a memory for storing a second video game program related to said first video game program;
   a second processing system which is structurally different from said first processing system for executing said second video game program related to said first video game program; and
   a second video game device read-write memory for storing first video game related data received from said first video game system for processing by said second processing system during the execution of said second video game program.

31. A home video game system according to claim 30, wherein said first video game system is a hand-held portable video game device and said second video game device is a relatively stationary home video game device which is coupled in use to a user's television.

32. A home video game system according to claim 30, wherein said read-write memory receives game-progression related data from said first video game system.

33. A home video game system according to claim 30, wherein said read-write memory is partitioned into a plurality of memory areas for respectively receiving game related data from a respective plurality of players.

34. A home video game system according to claim 30, wherein said first video game device includes a read-write memory for storing first video game-related data and wherein said second processing system is operable to write said first video game-related data to said second video game device read-write memory.

35. A home video game system according to claim 30, wherein said second video game device includes at least one player controller, said controller including a port for receiving game related data from said first video game device.

36. A home video game system according to claim 30, wherein said first video game device includes a first video game device read/write memory for storing game related data resulting from the execution of said first video game program, and said second video game device includes an insertion port for receiving said read/write memory.

37. In a home video game system including a first video game device having a first processing system, and a second video game device having a second processing system which is structurally different from said first processing system, a method of operating said video game system comprising the steps of:
   executing a first video game program by said first processing system to generate first video game related data;
   transferring said first video game related data from said first video game device to said second video game device;
   storing said first video game related data in a read-write memory resident in said second video game device; and
   executing a second video game program related to said first video game program by said second processing system and processing at least some of said first video game related data.

38. A method according to claim 37, wherein said first video game system is a hand-held portable video game device and said second video game device is a home video game system which is coupled in use to a user's television.

39. A method according to claim 37, wherein said transferring step includes the step of transferring game-progression related data from said first video game device to said second video game device.

40. A method according to claim 37, wherein said storing step includes the step of storing game related data into a plurality of partitioned areas of said read-write memory for storing game related data for a respective plurality of players.

41. A method according to claim 37, wherein said first video game device includes a first video game device read-write memory for storing first video game-related data and further including the step of reading said first video game related data from said first video game device read-write memory and writing said first video game-related data to said second video game device read-write memory.

42. A method according to claim 37, wherein the step of transferring includes the step of connecting a memory module used during the execution of said first video game program to an insertion port in said second video game device.

43. A method according to claim 37, wherein said second video game device includes at least one player controller, and said transferring step includes the step of transferring said first video game related data to said second video game device through a port in said at least one player controller.

44. For use in a home video game system including a first video game device having a first processing system for executing a first video game program, and a second video game device having a second processing system which is structurally different from said first processing system for executing a second video game program, and a connector for receiving externally stored instructions and data, a portable storage device for said second video game device comprising:
   a memory media for storing said second video game program including video game instructions and graphics data;
   an interface for coupling said video game instructions and said graphics data from said memory media to said connector;
   said video game instructions including instructions for causing said second processing system to transfer first video game related data from said first video game device to said second video game device, to store said first video game related data in a second video game device read-write memory resident in said second video game device, and to execute said second video game program so as to process at least some of said first video game related data.

45. A portable storage device according to claim 44, wherein said second video game device is a home video game system and said video game program instructions generate a video display on a user's television.

46. A portable storage device according to claim 44, wherein said video game instructions including instructions for causing said second processing system to process game-progression related data received from said first video game device.

47. A portable storage device according to claim 44, wherein said video game instructions including instructions for causing said second processing system to store game related data into one of a plurality of partitioned areas of said second video game device read-write memory for a respective plurality of players.

48. A portable storage device according to claim 44, wherein said first video game device includes a first video game device read-write memory for storing first video game-related data and wherein said video game instructions including instructions for causing said second processing system to read said first video game related data from said first video game device read-write memory and to write said first video game-related data to said second video game device read-write memory.

49. A portable storage device according to claim 44, wherein said second video game system includes an external memory insertion port and wherein video game instructions cause said second processing system to transfer said first video game related data to said second video game via said insertion port.

50. A portable storage device according to claim 44, wherein said second video game device includes at least one player controller, and wherein said video game instructions including instructions for causing said second processing system to transfer said first video game related data to said second video game device through a port in said at least one player controller.

51. A portable storage device according to claim 47, wherein said second video game device includes a plurality of player controllers, and wherein said video game instructions including instructions for causing said second processing system to associate a player controller with a memory partition.

52. An adapter for use with a video game system of the type including a memory cartridge connector, a processor that executes software supplied by a memory cartridge coupled to said memory cartridge connector, a 3D graphics coprocessor coupled to said processor, said 3D graphics coprocessor performing 3D image generation at least in part in response to commands provided by said processor, a video signal encoder coupled to said coprocessor that generates video signals representing images for display on a graphical display device, and a hand-held controller unit including user-operable controls and having a expansion port providing therein a lock claw and an expansion electrical connector, said adapter allowing said video game system to access a peripheral device that is incompatible with said memory cartridge connector, said adapter comprising:

a housing providing an insertion projection having a lock recess defined therein, said lock recess, in use, being engageable with said controller expansion port lock claw when said insertion projection is inserted into said controller expansion port, said housing further providing an insertion aperture;

a first electrical connector disposed at least in part in said adapter insertion projection, said first electrical connector, in use, establishing electrical connection with said controller expansion electrical connector; and a second electrical connector disposed at least in part within said adapter housing insertion aperture, said second electrical connector being electrically coupled to said first electrical connector and having a configuration that is different from said first electrical connector, said second electrical connector, in use, coupling to said peripheral device, wherein said adapter, in use, allows said video game system to write information to or read information from said peripheral device.

53. An adapter as in claim 52 wherein said peripheral device comprises a memory cartridge that is incompatible with said video game system memory cartridge connector.

54. An adapter as in claim 52 further including a printed circuit board that couples said first electrical connector to said second electrical connector, said printed circuit board further providing thereon a detection circuit that detects whether said peripheral device is connected to said second electrical connector.

55. An adapter as in claim 54 wherein a data transfer control circuit is also disposed on said printed circuit board, said data transfer control circuit transferring data from said peripheral device to said controller expansion connector.

56. An adapter as in claim 52 wherein said housing insertion aperture defines a slot into which said peripheral device is, in use, slided in a first direction, and said insertion projection projects substantially perpendicularly to said first direction.

* * * * *